(12) United States Patent
Masuda et al.

(10) Patent No.: US 9,068,520 B2
(45) Date of Patent: Jun. 30, 2015

(54) ENGINE CONTROL APPARATUS

(75) Inventors: Hiroshi Masuda, Osaka (JP); Yasuo Noma, Osaka (JP); Akihito Nishimura, Osaka (JP); Hideo Shiomi, Osaka (JP); Kimiyori Kobayashi, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 456 days.

(21) Appl. No.: 13/496,063

(22) PCT Filed: Sep. 15, 2010

(86) PCT No.: PCT/JP2010/065928
§ 371 (c)(1),
(2), (4) Date: Mar. 14, 2012

(87) PCT Pub. No.: WO2011/034084
PCT Pub. Date: Mar. 24, 2011

(65) Prior Publication Data
US 2012/0173124 A1   Jul. 5, 2012

(30) Foreign Application Priority Data

Sep. 18, 2009  (JP) ................................. 2009-216589
Sep. 18, 2009  (JP) ................................. 2009-217084

(51) Int. Cl.
| | | |
|---|---|---|
| *F02D 41/30* | (2006.01) | |
| *F02D 29/02* | (2006.01) | |
| *F02D 41/02* | (2006.01) | |
| *F02D 41/22* | (2006.01) | |

(52) U.S. Cl.
CPC ............ *F02D 29/02* (2013.01); *F02D 41/0215* (2013.01); *F02D 41/22* (2013.01); *F02D 2250/26* (2013.01); *Y02T 10/40* (2013.01)

(58) Field of Classification Search
CPC ........... F02D 29/00; F02D 1/08; F02D 29/02; F02D 41/04; F02D 45/00
USPC ................. 701/102–105, 110–111, 114–115; 123/350, 198 D; 73/114.15, 114.38, 73/114.45, 114.49, 114.52
See application file for complete search history.

(56) References Cited

U.S. PATENT DOCUMENTS

| | | | | |
|---|---|---|---|---|
| 4,836,165 | A * | 6/1989 | Kubota et al. ................. | 123/357 |
| 5,989,154 | A * | 11/1999 | Christensen et al. ......... | 477/111 |
| 6,772,060 | B2 * | 8/2004 | McCauley et al. ............ | 701/104 |

(Continued)

FOREIGN PATENT DOCUMENTS

| | | |
|---|---|---|
| JP | 09-125991 | 5/1997 |
| JP | 10-009033 | 1/1998 |

(Continued)

*Primary Examiner* — John Kwon
*Assistant Examiner* — Johnny H Hoang
(74) *Attorney, Agent, or Firm* — Jordan and Hamburg LLP

(57) ABSTRACT

An engine control apparatus in which a fuel injection apparatus injects a fuel to an engine; detecting means detects a drive state of the engine, and an ECU controls actuation of the fuel injection apparatus on the basis of a detection information of the detecting means and a specific output characteristic data of the engine, wherein compensating means for compensating the output characteristic data is provided, and the ECU is structured such as to compute a limit torque value on the basis of a result of compensation of the output characteristic data by the compensating means and the detection information of the detecting means, and actuate the fuel injection apparatus in correspondence to the limit torque value.

10 Claims, 28 Drawing Sheets

(56) References Cited

U.S. PATENT DOCUMENTS

| | | |
|---|---|---|
| 7,031,822 B1 | 4/2006 | Hashimoto et al. |
| 7,373,239 B2 * | 5/2008 | Kamado et al. ............... 701/103 |
| 2001/0023374 A1 | 9/2001 | Yashiki et al. |
| 2002/0006848 A1 * | 1/2002 | Tabata ........................... 477/32 |
| 2004/0117105 A1 | 6/2004 | Harada et al. |
| 2011/0137539 A1 * | 6/2011 | Jankovic et al. ............... 701/103 |
| 2011/0172897 A1 * | 7/2011 | Tsuzuki et al. ............... 701/103 |
| 2012/0004814 A1 * | 1/2012 | Hyodo et al. ................... 701/50 |

FOREIGN PATENT DOCUMENTS

| | | |
|---|---|---|
| JP | 10-159599 | 6/1998 |
| JP | 2001-263156 | 9/2001 |
| JP | 2002-014009 | 1/2002 |
| JP | 2002-089352 | 3/2002 |
| JP | 2006-170214 | 6/2006 |
| JP | 2006-207387 | 8/2006 |

* cited by examiner

ENGINE CONTROL APPARATUS

TECHNICAL FIELD

The present invention relates to an engine control apparatus which is mounted to a working vehicle, for example, a tractor.

BACKGROUND OF THE INVENTION

In an engine in recent years, there has been known such a technique that a reduction of a nitrogen oxide (NOx) discharged from the engine and a reduction of a noise and a vibration of the engine are achieved by feeding a high pressure fuel to an injector with respect to each of cylinders by utilizing a common rail type fuel injection apparatus, and electronically controlling an injection pressure, an injection timing, and an injection period (an injection amount) of the fuel from each of the injectors (refer to patent document 1 or the like).

CITATION LIST

Patent Document 1: Japanese Unexamined Patent Publication No. 10-9033

In the working vehicle such as the tractor or the like which mounts this kind of engine, an ECU controls an actuation of the common rail type fuel injection apparatus on the basis of an output characteristic data, a rotating speed, and a torque, for example, of a map type, a function table type or the like, thereby regulating an engine output on the basis of the fuel injection amount in correspondence to an amount of operation of a shift lever or the like. The output characteristic data is structured such as to correspond to a vehicle on which the engine is mounted, and is normally stored only one kind or only limited kinds in the ECU. Accordingly, in the conventional structure mentioned above, there has been such a problem that it is hard to apply, for example, an ECU of an engine for a tractor as an ECU of an engine for a back hoe (that is, a general purpose property of the ECU is low), even if the type of the engine is the same. In this case, the problem mentioned above exists even in a case of an electronic governor type in addition to the common rail type fuel injection apparatus.

Accordingly, the present invention has a technical object in provision of an engine control apparatus which dissolves the problem mentioned above.

SUMMARY OF THE INVENTION

A first aspect of the invention is an engine control apparatus provided with an engine which is mounted to a working vehicle, a fuel injection apparatus which injects a fuel to the engine, detecting means which detects a drive state of the engine, and an ECU which controls an actuation of the fuel injection apparatus on the basis of a detection information of the detecting means and a specific output characteristic data of the engine, wherein compensating means for compensating the output characteristic data is provided, and the ECU is structured such as to compute a limit torque value on the basis of a result of compensation of the output characteristic data by the compensating means and the detection information of the detecting means, and actuate the fuel injection apparatus in correspondence to the limit torque value.

A second aspect of the invention is the engine control apparatus described in the first aspect, wherein data storage means serving as the compensating means stores a correction characteristic data for correcting the actuation of the fuel injection apparatus, and the ECU computes the result of compensation of the output characteristic data on the basis of the correction characteristic data, in correspondence to a setting of identifying means in association with the correction characteristic data.

A third aspect of the invention is the engine control apparatus described in the first aspect, wherein data storage means serving as the compensating means stores a plurality of correction characteristic data in correspondence to the kind of working machines which are installable to the working vehicle, and the ECU decides the correction characteristic data read out of the data storage means in correspondence to the working machine which is installed to the working vehicle, and computes the result of compensation of the output characteristic data on the basis of the correction characteristic data.

A fourth aspect of the invention is the engine control apparatus described in the first aspect, wherein data storage means serving as the compensating means stores a torque limit rate which limits the torque with respect to a predetermined rotating speed in the output characteristic data, and the ECU computes the result of compensation of the output characteristic data on the basis of the torque limit rate.

A fifth aspect of the invention is the engine control apparatus described in the first aspect, wherein data storage means serving as the compensating means stores a plurality of correction characteristic data, and the ECU decides the correction characteristic data read out of the data storage means by select switch means which is provided in the working vehicle, and computes the result of compensation of the output characteristic data on the basis of the correction characteristic data.

A sixth aspect of the invention is the engine control apparatus described in the first aspect, wherein the compensating means is manual operating means which is provided in the working vehicle, and the manual operating means is structured such as to variably set a torque limit rate which limits the torque with respect to a predetermined rotating speed in the output characteristic data.

A seventh aspect of the invention is the engine control apparatus described in any one of the first to sixth aspects, wherein the ECU is structured such as to actuate the fuel injection apparatus on the basis of the detection information of the detecting means and the output characteristic data in the case that it does not detects the compensating means.

An eighth aspect of the invention is the engine control apparatus described in any one of the first to seventh aspects, wherein the ECU is structured such as to determine a fail state in the case that the compensating means does not respond under a state in which a wiring to the compensating means is connected so as to actuate informing means which informs of the matter.

A ninth aspect of the invention is the engine control apparatus described in any one of the first to sixth aspects, wherein the ECU is structured such as to actuate the fuel injection apparatus on the basis of the detection information of the detecting means and the output characteristic data, in the case that the working machine is not installed to the working vehicle.

A tenth aspect of the invention is the engine control apparatus described in the first aspect, wherein data storage means serving as the compensating means stores a plurality of correction characteristic data, each of the characteristic data is a data which indicates a relationship between the rotating speed and the torque in the engine, and the correction characteristic data is set in such a manner as to limit the torque with respect to a predetermined rotating speed in comparison with the output characteristic data.

An eleventh aspect of the invention is the engine control apparatus described in the first aspect, wherein the correction characteristic data is a limit value of the rotating speed in the engine.

a twelfth aspect of the invention is the engine control apparatus described in the tenth or eleventh aspect, wherein the data storage means is constructed by external memory means such as a different data ECU from the ECU of the engine and a memory, or a signal compensation circuit which is variably adjustable by a manual operation.

A thirteenth aspect of the invention is an engine control apparatus provided with an engine which is mounted to a working vehicle, a fuel injection apparatus which injects a fuel to the engine, detecting means which detects a drive state of the engine, and an ECU which controls an actuation of the fuel injection apparatus on the basis of a detection information of the detecting means and a specific output characteristic data of the engine, wherein the engine control apparatus has data storage means in which a correction characteristic data for correcting the output characteristic data is stored, and the ECU corrects the output characteristic data on the basis of the correction characteristic data as long as receiving the correction characteristic data from the data storage means, and actuates the fuel injection apparatus on the basis of the corrected output characteristic data and the detection information of the detecting means.

A fourteenth aspect of the invention is the engine control apparatus described in the thirteenth aspect, wherein the ECU actuates the fuel injection apparatus on the basis of the output characteristic data and the detection information of the detecting means, in the case that it does not receive the correction characteristic data from the data storage means.

A fifteenth aspect of the invention is the engine control apparatus described in the thirteenth or fourteenth aspect, wherein the data storage means stores a plurality of limit injection amount values in which a fuel injection amount with respect to a predetermined rotating speed is reduced in comparison with a maximum characteristic line of the output characteristic data, as the correction characteristic data, and the ECU corrects the maximum characteristic line of the output characteristic data in such a direction that the fuel injection amount with respect to an optional rotating speed is reduced, on the basis of the plurality of limit injection amount values.

A sixteenth aspect of the invention is the engine control apparatus described in the fifteenth aspect, wherein the plurality of limit injection amount values are constructed by setting three points including an injection amount value with respect to a low speed rotating speed, an injection amount value with respect to a rotating speed at a time when a maximum torque is generated, and an injection amount value with respect to a rated rotating speed to one set.

According to the first aspect of the invention, in the engine control apparatus provided with the engine which is mounted to the working vehicle, the fuel injection apparatus which injects the fuel to the engine, the detecting means which detects the drive state of the engine, and the ECU which controls the actuation of the fuel injection apparatus on the basis of the detection information of the detecting means and the specific output characteristic data of the engine, the compensating means for compensating the output characteristic data is provided, and the ECU is structured such as to compute the limit torque value on the basis of the result of compensation of the output characteristic data by the compensating means and the detection information of the detecting means, and actuate the fuel injection apparatus in correspondence to the limit torque value, an engine manufacturer can make all the output characteristic data stored in the ECU identical (in common) as long as the type of the engine is the same. Further, an engine purchasing manufacturer that mounts the engine to the working vehicle can obtain the result of compensation which complies with its own specification from the compensating means. In other words, it is possible to select an optimum fuel injection control per kind of vehicle to which the engine is mounted, and per working machine which is installed to the working vehicle, by the compensating means. Therefore, there can be achieved such an effect that can accomplish both an advantage of the engine manufacturer, that is, an improvement of a general purpose property of the ECU, and an advantage of the engine purchasing manufacturer, that is, a reservation of compatibility of the ECU with respect to the working vehicle.

According to the second aspect of the invention, in the engine control apparatus described in the first aspect, since the data storage means serving as the compensating means stores the correction characteristic data for correcting the actuation of the fuel injection apparatus, and the ECU computes the result of compensation of the output characteristic data on the basis of the correction characteristic data, in correspondence to the setting of the identifying means in association with the correction characteristic data, it is possible to compensate the output characteristic data by using the correction characteristic data so as to limit the torque of the engine on the basis of the result of compensation as long as the identifying means is set. Therefore, there can be obtained such an effect that it is possible to execute the fuel injection control which is compensated in conformity to the specification of the engine purchasing manufacturer, without troubling an operator (without depending on a degree of skill or the like).

According to the third aspect of the invention, in the engine control apparatus described in the first aspect, since the data storage means serving as the compensating means stores a plurality of correction characteristic data in correspondence to the kind of working machines which are installable to the working vehicle, and the ECU decides the correction characteristic data read out of the data storage means in correspondence to the working machine which is installed to the working vehicle, and computes the result of compensation of the output characteristic data on the basis of the correction characteristic data, the ECU can extract the correction characteristic data (for the working machine) which is suitable for the working machine, as long as the working machine is installed to the working vehicle. Therefore, it is possible to specify and select the correction characteristic data for the working machine accurately without troubling the operator. In other words, there can be obtained such an effect that it is possible to accurately execute an optimum fuel injection control per the working machine, for example, without depending on the degree of skill of the operator or the like, in spite that it is possible to secure a flexible setting of the ECU with respect to the fuel injection control.

According to the fourth aspect of the invention, in the engine control apparatus described in the first aspect, since the data storage means serving as the compensating means stores the torque limit rate which limits the torque with respect to the predetermined rotating speed in the output characteristic data, and the ECU computes the result of compensation of the output characteristic data on the basis of the torque limit rate, it is possible to maintain a droop characteristic of the correction characteristic data on the basis of the compensation of the engine purchasing manufacturer in a similar shape of a droop characteristic of the output characteristic data, and it is possible for the engine manufacturer to drive the engine in a state which is close to its own design concept. Further, for the engine purchasing manufacturer, it is possible to execute the fuel injection control which complies with its own specification on the basis of a simple setting of setting the correction characteristic data to the torque limit rate, and there can be achieved such an effect that it is possible to lighten a burden of a software design (a correction characteristic data design) which takes a lot of trouble.

According to the fifth aspect of the invention, in the engine control apparatus described in the first aspect, since the data storage means serving as the compensating means stores a plurality of correction characteristic data, and the ECU decides the correction characteristic data read out of the data storage means by the select switch means which is provided in the working vehicle, and computes the result of compensation of the output characteristic data on the basis of the correction characteristic data, the ECU can select the correction characteristic data which is optimum for the working vehicle to which the engine is mounted, on the basis of the operation of the select switch means. Therefore, it is possible to easily change the compensation of the output characteristic data in conformity to a working condition and a preference and a desire of the operator, and there can be achieved such an effect that it is possible to execute a suitable fuel injection control in correspondence to the condition.

According to the sixth aspect of the invention, in the engine control apparatus described in the first aspect, since the compensating means is the manual operating means which is provided in the working vehicle, and the manual operating means is structured such as to variably set the torque limit rate which limits the torque with respect to the predetermined rotating speed in the output characteristic data, the ECU can change and regulate to the correction characteristic data which is optimum for the working vehicle to which the engine is mounted on the basis of the operation of the manual operating means. Therefore, it is possible to change the compensation of the output characteristic data in stages or continuously in conformity to the working condition and the preference and the desire of the operator, and there can be achieved such an effect that it is possible to carry out a careful dealing with respect to the fuel injection control.

According to the seventh aspect of the invention, in the engine control apparatus described in any one of the first to sixth aspects, since the ECU is structured such as to actuate the fuel injection apparatus on the basis of the detection information of the detecting means and the output characteristic data in the case that it does not detects the compensating means, a fail safe function using the output characteristic data works even if a trouble, for example, a malfunction, an erroneous motion or the like of the compensating means is generated and it is impossible to detect the compensating means. Therefore, there can be achieved such an effect that it is possible to avoid a matter that the ECU erroneously operates or stops, and the engine erroneously operates or stops.

According to the eighth aspect of the invention, in the engine control apparatus described in any one of the first to seventh aspects, since the ECU is structured such as to determine the fail state in the case that the compensating means does not respond under the state in which the wiring to the compensating means is connected so as to actuate the informing means which informs of the matter, for example, in the case that the compensating means which does not store the correction characteristic data is erroneously connected to the ECU, and in the case that a disconnection is generated between the ECU and the compensating means, such a fact can be comprehended by an actuation of the informing means. Therefore, there can be achieved such an effect that it is possible to avoid a risk of failing to store the correction characteristic data in the compensating means, or overlooking a disconnection in the connection circuit.

In the meantime, since the working vehicle which does not install the working machine is assumed in a state of executing a normal travel such as a road travel without executing various works such as a farm work and the like, it is not necessary to allow itself to use such a correction characteristic data as to comply with the working characteristic, but it is sufficient to carry out the fuel injection control by using the originally provided output characteristic data. In this regard, in the ninth aspect of the invention, since the ECU is structured such as to actuate the fuel injection apparatus on the basis of the detection information of the detecting means and the output characteristic data, in the case that the working machine is not installed to the working vehicle, there can be achieved such an effect that it is possible to easily execute an efficient fuel injection control in correspondence to with or without the installation of the working machine (a used condition of the working vehicle), without a detailed setting operation or the like.

According to the tenth aspect of the invention, in the engine control apparatus described in the first aspect, since each of the characteristic data is the data which indicates the relationship between the rotating speed and the torque in the engine, and the correction characteristic data is set in such a manner as to limit the torque with respect to the predetermined rotating speed in comparison with the output characteristic data, the fuel injection is held down in the fuel injection control using the correction characteristic data, in comparison with the fuel injection control using the output characteristic data. Therefore, there can be achieved such an effect that it is possible to cope with an exhaust gas regulation by one kind of ECU so as to take into account an environmental pollution with respect to the one type of engine, in spite that the optimum fuel injection control can be selected per the kind of vehicle to which the engine is mounted, and per the working machine which is installed to the working vehicle, by the data storage means.

According to the eleventh aspect of the invention, in the engine control apparatus described in the first aspect, since the correction characteristic data is the limit value of the rotating speed in the engine, it is possible to execute the fuel injection control which complies with its own specification for the engine purchasing manufacturer, only by setting the correction characteristic data to the rotating speed limit value, and there can be achieved such an effect that it is possible to lighten a burden of a software design (a correction characteristic data design) which takes a lot of trouble.

According to the twelfth aspect of the invention, in the engine control apparatus described in the tenth or eleventh aspect, since the data storage means is constructed by the external memory means such as the different data ECU from the ECU of the engine and the memory, or the signal compensation circuit which is variably adjustable by the manual operation, the data storage means has a lot of variations, and there can be achieved such an effect that it is possible to reduce a burden on a design such as a regulation limit or the like, at a time when the engine purchasing manufacturer designs the data storage means.

According to the thirteenth aspect of the invention, in the engine control apparatus provided with the engine which is mounted to the working vehicle, the fuel injection apparatus which injects the fuel to the engine, the detecting means which detects the drive state of the engine, and the ECU which controls the actuation of the fuel injection apparatus on the basis of the detection information of the detecting means and the specific output characteristic data of the engine, since the engine control apparatus has the data storage means in which the correction characteristic data for correcting the output characteristic data is stored, and the ECU corrects the output characteristic data on the basis of the correction characteristic data as long as receiving the correction characteristic data from the data storage means, and actuates the fuel injection apparatus on the basis of the corrected output characteristic data and the detection information of the detecting means, the engine manufacturer can make the output characteristic data stored in the ECU in common, as long as the type of the engine is the same. The engine purchasing manufacturer can execute a fuel injection control which is optimum for its own specification by using the correction characteristic data, without replacing the output characteristic data by the characteristic data of its own specification. Therefore, in the same manner as the invention of the first aspect, there can be achieved such an effect that can accomplish both the advantage of the engine manufacturer, that is, the improvement of a general purpose property of the ECU, and the advantage of the engine purchasing manufacturer, that is, the reservation of compatibility of the ECU with respect to the working vehicle.

According to the fourteenth aspect of the invention, in the engine control apparatus described in the thirteenth aspect, since the ECU actuates the fuel injection apparatus on the basis of the output characteristic data and the detection information of the detecting means, in the case that it does not receive the correction characteristic data from the data storage means, there can be achieved such an effect that it is possible to easily execute an efficient fuel injection control, for example, in correspondence to with or without the installation of the working machine, the used condition of the working vehicle or the like, without a detailed setting operation or the like.

According to the fifteenth aspect of the invention, in the engine control apparatus described in the thirteenth or fourteenth aspect, since the data storage means stores a plurality of limit injection amount values in which the fuel injection amount with respect to the predetermined rotating speed is reduced in comparison with the maximum characteristic line of the output characteristic data, as the correction characteristic data, and the ECU corrects the maximum characteristic line of the output characteristic data in such a direction that the fuel injection amount with respect to the optional rotating speed is reduced, on the basis of the plurality of limit injection amount values, it is possible to maintain a droop characteristic of the output characteristic data after the correction in a state which is close to a droop characteristic of the output characteristic data before the correction. Therefore, there can be achieved such an effect that it is possible to execute the fuel injection control, in a state which is close to the design concept of the engine manufacturer and complies with the specification of the engine purchasing manufacturer. Further, there is also such an advantage that it is possible to easily set a variation of the droop characteristic on the basis of the limit injection amount value, and it becomes easy to cope with the various settings of the fuel injection control.

According to the sixteenth aspect of the invention, in the engine control apparatus described in the fifteenth aspect, since the plurality of limit injection amount values are constructed by setting three points including the injection amount value with respect to the low speed rotating speed, the injection amount value with respect to the rotating speed at a time when the maximum torque is generated, and the injection amount value with respect to the rated rotating speed to one set, it is possible to efficiently revise the maximum characteristic line downward by a reduced number of points.

BRIEF DESCRIPTION OF THE DRAWINGS

FIGS. 14(a) and (b) are explanatory views in the case of changing a rotating speed limit value during an engine drive, in which FIG. 14(a) is a case that a droop characteristic is not changed, and FIG. 14(b) is a case that the droop characteristic is changed in conjunction;

DESCRIPTION OF THE PREFERRED EMBODIMENTS

A description will be given below of embodiments obtained by embodying the present invention on the basis of the accompanying drawings in the case that it is applied to a diesel engine which is mounted to a tractor as a vehicle.

(1) Common Rail Apparatus and Fuel System Structure of Diesel Engine

Figure 3:
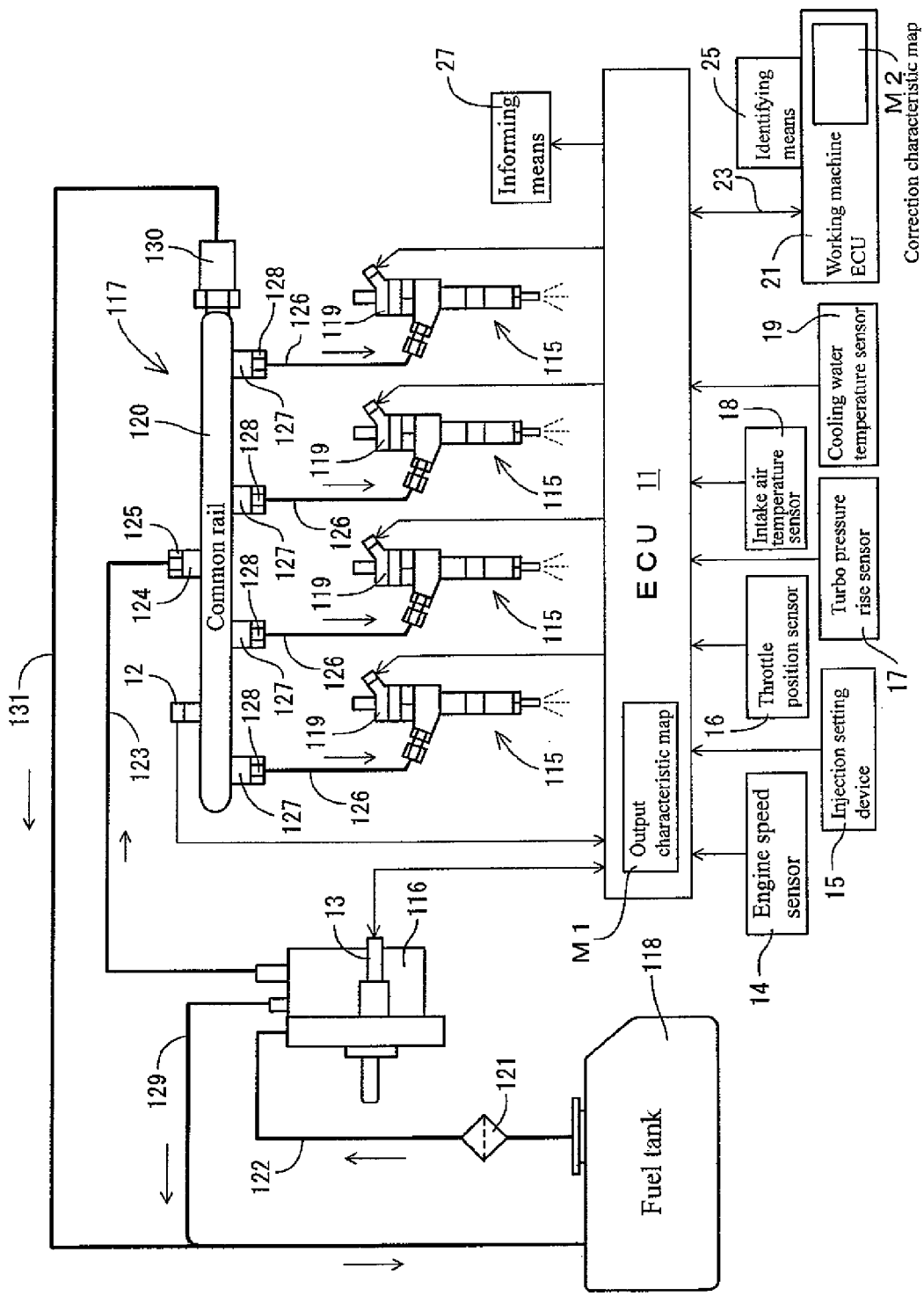
FIG. 3 is an explanatory view of a fuel system of a diesel engine.
Figure 4:
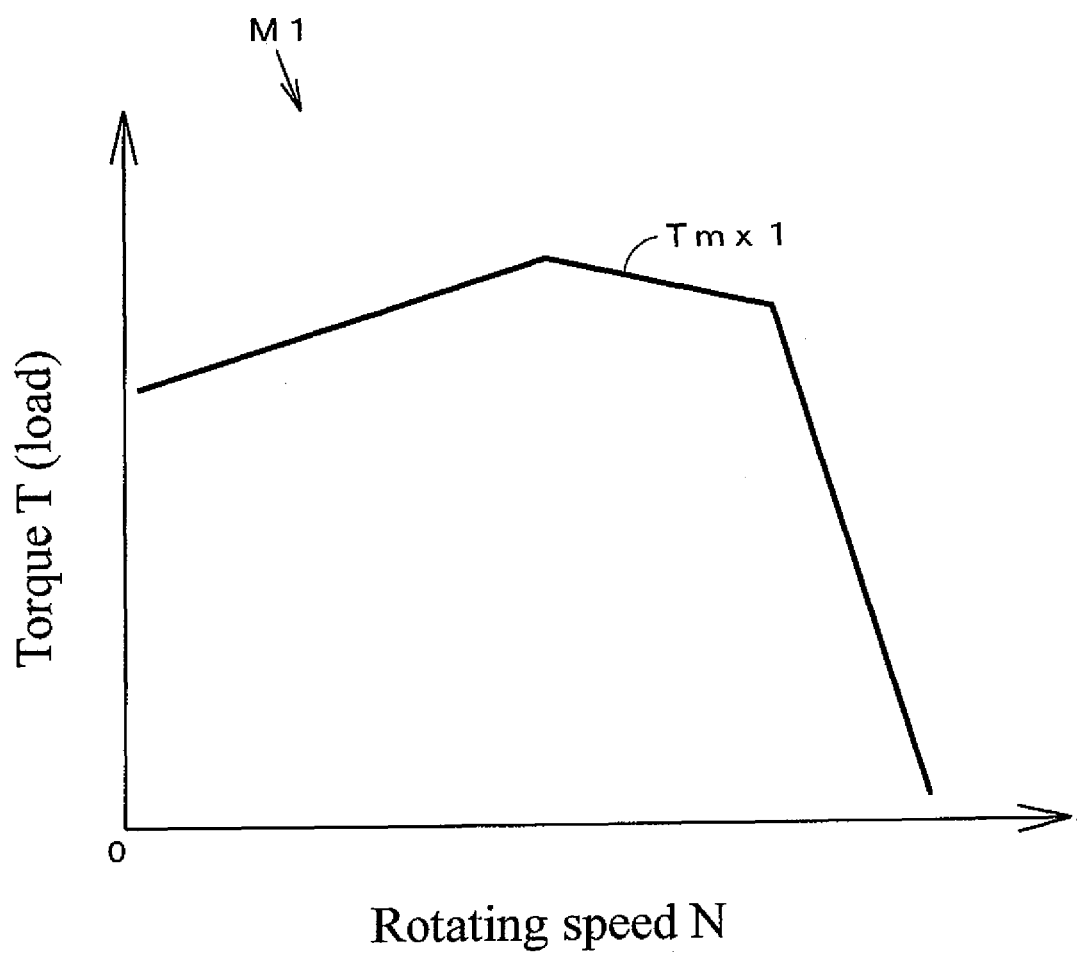
FIG. 4 is an explanatory view of an output characteristic map.

First of all, a description will be given of a common rail apparatus 117 (a common rail type fuel injection apparatus) and a fuel system structure of a diesel engine 70 with reference to FIG. 3. As shown in FIG. 3, a fuel tank 118 is connected to each of injectors 115 of four cylinders which are provided in the diesel engine 70, via the common rail apparatus 117 and a fuel feed pump 116. Each of the injectors 115 is provided with an electromagnetically opening and closing control type fuel injection valve 119. The common rail apparatus 117 is provided with a cylindrical common rail 120.

As shown in FIG. 3, the fuel tank 118 is connected to an intake side of the fuel feed pump 116 via a fuel filter 121 and a low pressure pipe 122. A fuel within the fuel tank 118 is sucked into the fuel feed pump 116 via the fuel filter 121 and the low pressure pipe 122. The fuel feed pump 116 in the embodiment is arranged in the vicinity of an intake manifold 73. Specifically, it is provided in a right side surface side of a cylinder block 75 (in an installation side of the intake manifold 73) and below the intake manifold 73. On the other hand, the common rail 120 is connected to a discharge side of the fuel feed pump 116 via a high pressure pipe 123. Further, each of the injectors 115 of four cylinders is connected to the common rail 120 via four fuel injection pipes 126.

With the structure mentioned above, the fuel in the fuel tank 118 is pressure fed to the common rail 120 by the fuel feed pump 116, and the high pressure fuel is stored in the common rail 120. Each of the fuel injection valves 119 is controlled so as to be opened and closed, whereby the high pressure fuel within the common rail 120 is injected to each of the cylinders of the diesel engine 70 from each of the injectors 115. In other words, an injection pressure, an injecting timing, and an injecting period (an injection amount) of the fuel fed from each of the injectors 115 are controlled at a high precision by electronically controlling each of the fuel injection valves 119. Accordingly, it is possible to reduce a nitrogen oxide (NOx) from the diesel engine 70, and it is possible to reduce a noise and a vibration of the diesel engine 70.

In this case, as shown in FIG. 3, the fuel feed pump 116 is connected to the fuel tank 118 via a fuel return pipe 129. A common rail return pipe 131 is connected to an end portion in a longitudinal direction of the cylindrical common rail 120 via a return pipe connector 130 which limits a pressure of the fuel within the common rail 120. In other words, an excess fuel of the fuel feed pump 116 and an excess fuel of the common rail 120 are recovered in the fuel tank 118 via the fuel return pipe 129 and the common rail return pipe 131.

(2) Fuel Injection Control of Common Rail in First Embodiment

Next, a description will be given of a fuel injection control of the common rail 120 in the first embodiment with reference to FIG. 1 to FIG. 6. As shown in FIG. 3, there is provided with an ECU 11 which actuates the fuel injection valve 119 of each of the cylinders in the diesel engine 70. Although not being illustrated in detail, the ECU 11 is provided with an EEPROM which stores a control program and a data, a flush memory, an RAM which temporarily stores the control program and the data, a CAN controller, an input and output interface and the like, in addition to a CPU which executes various computing processes and controls, and is arranged in the diesel engine 70 or in the vicinity thereof.

To an input side of the ECU 11, there are at least connected a rail pressure sensor 12 which detects the fuel pressure within the common rail 120, an electromagnetic clutch 13 which rotates or stops the fuel pump 116, an engine speed sensor 14 which detects a rotating speed of the diesel engine 70 (a cam shaft position of the crank shaft 74), an injection setting device 15 which detects and sets a fuel injection frequency (a fuel injection frequency per a fuel injection period of one stroke) of the injector 115, a throttle position sensor 16 which detects an operation position of an acceleration operating device (an illustration is omitted) such as a throttle lever, an acceleration pedal or the like, a turbo pressure rise sensor 17 which detects a pressure of a turbo supercharger 100, an intake air temperature sensor 18 which detects an intake air temperature of the intake manifold 73, and a cooling water temperature sensor 19 which detects a temperature of a cooling water of the diesel engine 70. These sensors 12 to 19 construct the detecting means which detect the drive state of the diesel engine 70.

At least an electromagnetic solenoid of each of the fuel injection valves 119 of four cylinders is connected to an output side of the ECU 11. In other words, it is structured such that the high pressure fuel stored in the common rail 120 is injected from the fuel injection valve 119 at a plurality of times during one stroke while controlling the fuel injection pressure, the injection timing, and the injection period, thereby suppressing a generation of the nitrogen oxide (NOx), executing a complete combustion in which a generation of a soot, a carbon dioxide and the like is reduced, and improving a fuel consumption. Further, informing means 27 such as an alarm buzzer or an alarm lamp is connected to the output side of the ECU 11.

An output characteristic map M1 (refer to FIG. 4) serving as an output characteristic data which indicates a relationship between a rotating speed N and a torque T (a load) of the diesel engine 70 is previously stored in the memory means (the flush memory or the EEPROM) which is provided in the ECU 11. This kind of output characteristic map M1 is determined on the basis of an experiment or the like. In this case, the output characteristic data is not limited to a map type as in the embodiment, but may employ, for example, a function table, a set data (a data table) or the like. In the output characteristic map M1 shown in FIG. 4, the rotating speed N is applied to a horizontal axis, and the torque T is applied to a vertical axis. In the output characteristic map M1, a solid line Tmx1 which is drawn as an upward convex curved shape is a maximum torque line which expresses a maximum torque with respect to each of the rotating speeds N. In this case, as long as the type of the diesel engine 70 is the same, the output characteristic maps M1 stored in the ECU 11 all come to an identical (common) one.

The ECU 11 is basically structured such as to determine the torque T on the basis of the rotating speed which is detected by the engine speed sensor 14 and the throttle position which is detected by the throttle position sensor 16, compute a target fuel injection amount R by using the torque T and the output characteristic map M1, and execute such a fuel injection control as to actuate the common rail apparatus 117 on the basis of the result of computation. In this case, the fuel injection amount is regulated by regulating a valve opening period of each of the fuel injection valves 119 and changing the injection period to each of the injectors 115.

In each of the embodiments of the present invention, compensating means which compensates the output characteristic map M1 is provided, and the ECU 11 computes the limit torque value on the basis of the result of compensation of the output characteristic map M1 by the compensating means and the detection values of the engine speed sensor 14 and the throttle position sensor 16, and can actuate the common rail apparatus 117 in correspondence to the limit torque value. In the first embodiment shown in FIG. 1 to FIG. 5, a working machine ECU 21 which is the data storage means is employed as one example of the compensating means.

Figure 2:
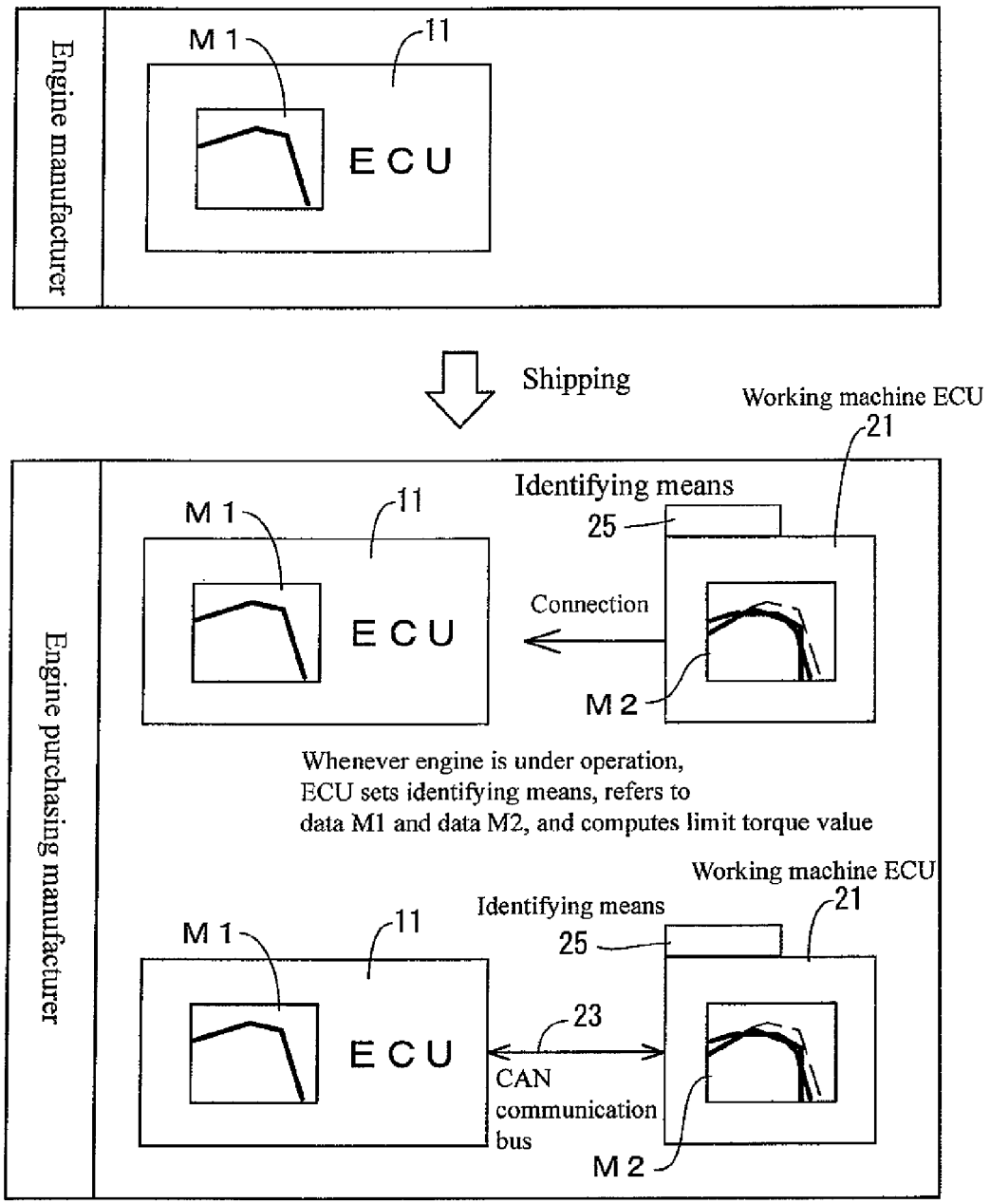
FIG. 2 is an explanatory view of a concept and shows a state of an ECU before and after shipping an engine.

The working machine ECU 21 serving as the data storage means is electrically connected to the ECU 11 of the first embodiment via a CAN communication bus 23 (refer to FIG. 2 and FIG. 3). The working machine ECU 21 has a function of controlling a drive of a working machine (a power tiller, a plow, a bucket or the like) which is installed to the working vehicle. The working machine ECU 21 is provided with the CPU, the EEPROM, the flush memory, the RAM, the CAN controller, the input and output interface and the like, in the same manner as the ECU 11, and can be arranged at an optional position of the working machine. Of course, it can be arranged in the diesel engine 70 or a main body side of the working vehicle in conjunction with the ECU 11. The CAN communication bus 23 is a communication line for a data communication in accordance with a CAN (a controller area network) protocol. As is apparent from this point, a CAN communication environment is applied to the ECU 11 and the working machine ECU 21. The data communication in accordance with the CAN communication protocol is obtained by developing a LAN communication environment, and the CAN communication protocol is a serial communication protocol which keeps a distributed real time control and a multiplexing by using two differential wire bus lines having a common return (a command which returns a program moving into a sub routine or an interruption routine to a main routine).

A correction characteristic map M2 (refer to FIG. 5) serving as a correction characteristic data for correcting an actuation of the common rail apparatus 117 is previously stored in the memory means (the flush memory or the EEPROM) of the working machine ECU 21. The correction characteristic map M2 indicates the relationship between the rotating speed N and the torque T (the load) of the diesel engine 70, in the same manner as the output characteristic map M1 of the ECU 11. Even in the correction characteristic map M2 shown in FIG. 5, the rotating speed N is applied to the horizontal axis and the torque T is applied to the vertical axis. In the correction characteristic map M2, a solid line Tmx2 which is drawn as an upward convex curved shape is a maximum torque line which indicates the maximum torque with respect to each of the rotating speed N. In this case, the correction characteristic data is not limited to the map type as the embodiment, but may employ, for example, the function table, the set data (the data table) or the like, in the same manner as the output characteristic data.

Figure 5:
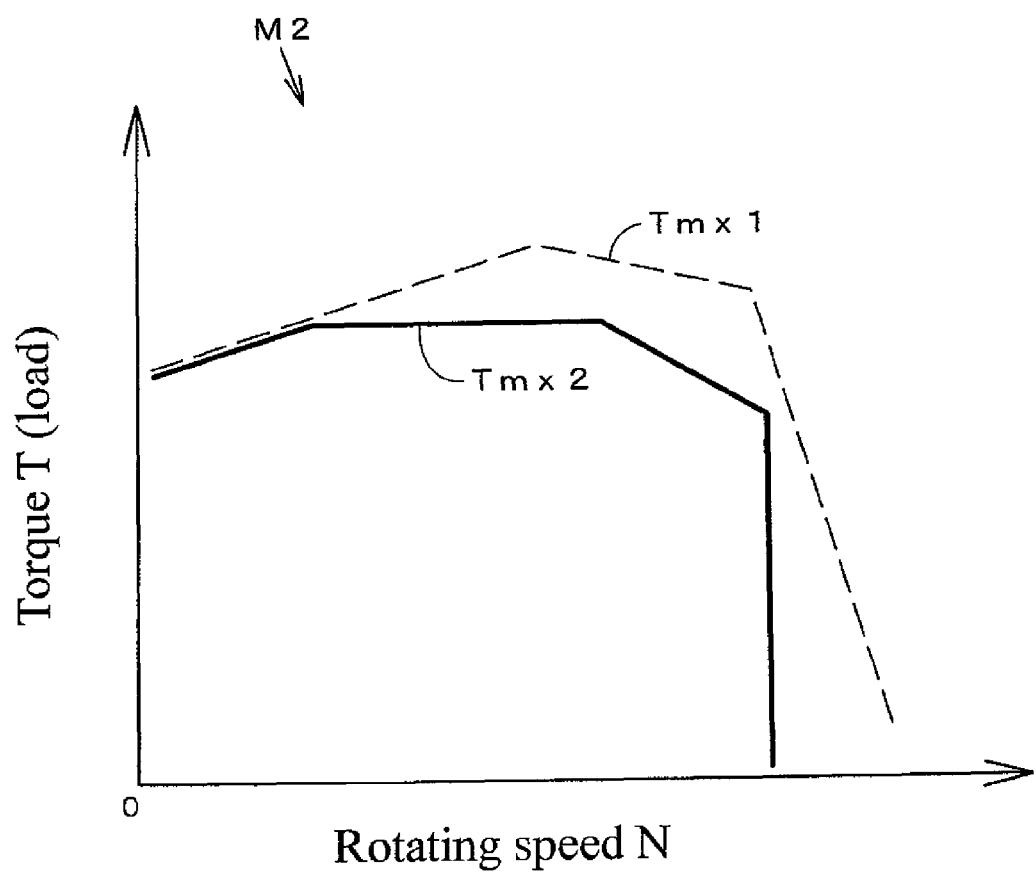
FIG. 5 is an explanatory view of a correction characteristic map.

In the correction characteristic map M2 (shown by a solid line in FIG. 5), it is set such as to limit the torque T with respect to the predetermined rotating speed N, in comparison with the output characteristic map M1 (shown by a broken line in FIG. 5). In other words, a relationship between the correction characteristic map M2 and the output characteristic map M1 is set in such a manner that the maximum torque in the same rotating speed N becomes smaller in the case that it is determined from the correction characteristic map M2 than in the case that it is determined from the output characteristic map M1 (Tmx1≤Tmx2) (it is set such that a maximum torque line Tmx2 in the correction characteristic map M2 side is positioned in an inner side (in a lower side) of the maximum torque line Tmx1 in the output characteristic map M1 side).

The correction characteristic map M2 which is stored in the working machine ECU 21 can be individually set per the kind of vehicle to which the diesel engine 70 is mounted, or per the working machine (the power tiller, the plow, the bucket of the like) which is installed to the working vehicle, even if the type of the diesel engine 70 is the same. As an example of the setting of the correction characteristic map M2 mentioned above, for example, there can be thought an output characteristic which is structured such that a high torque is obtained over a wide range rotating speeds, for suppressing an engine stop with respect to a work having a great load fluctuation, an output characteristic which is structured such that a rotating fluctuation by a load fluctuation is made small, for enhancing a working efficiency with respect to a work having a small load fluctuation, an output characteristic which is structured such that the rotating speed is lowered before the connection, for reducing a shock by connection with respect to a connecting work of a clutch, and the like.

Figure 1:
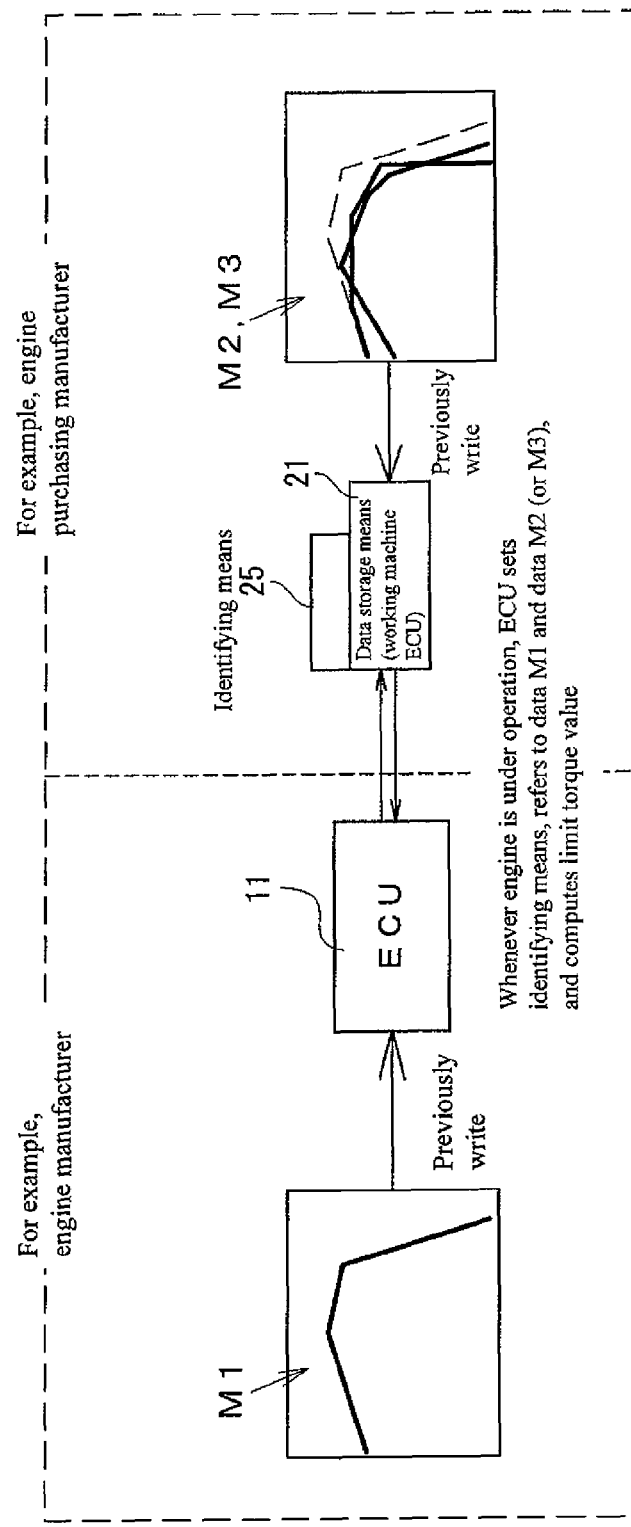
FIG. 1 is an explanatory view of a concept and summarizes a first embodiment.

In the first embodiment, the ECU 11 to which the working machine ECU 21 is connected is structured such as to compute the torque T on the basis of the detection values of the engine speed sensor 14 and the throttle position sensor 16, the output characteristic map M1, and the correction characteristic map M2 so as to determine the target fuel injection amount R, and actuate the common rail apparatus 117 (in such a manner as to limit the torque T with respect to the predetermined rotating speed N) on the basis of the result of computation (refer to FIG. 1 and FIG. 2). In this case, for example, in the case that the correction characteristic data employs, a function (a numerical expression) or a set data, the target fuel injection amount R is determined by determining the limit torque value on the basis of the detection values of the engine speed sensor 14 and the throttle position sensor 16, the output characteristic data, and the correction characteristic data, and the common rail apparatus 117 is actuated (in such a manner that the torque T with respect to the predetermined rotating speed N is limited) on the basis of the result of computation.

The ECU 11 is structured such as to decide whether it reads the correction characteristic map M2 from the working machine ECU 21 so as to refer thereto (whether the correction characteristic map M2 is used for correcting the output characteristic map M1) by setting identifying means 25 which is associated with the correction characteristic map M2. As the identifying means 25, there can be thought such a structure which decides whether the correction characteristic map M2 is used, by setting a jumper pin which is provided in the ECU 11, or setting a terminal of a coupler which is connected to the ECU 11 from the working machine ECU 21. The ECU 11 of the first embodiment is set in such a manner as to compute the target fuel injection amount R which is limited by torque by using both the characteristic maps M1 and M2 in the case that the working machine ECU 21 is connected to the ECU 11 and a response exists, and compute the target fuel injection amount R by using the output characteristic map M1 in the case that it is not connected or any response does not exist. In other words, with or without the connection and the response of the working machine ECU 21 with respect to the ECU 11 serves as the identifying means 25. The state in which the working machine ECU 21 is not connected corresponds to "the case that it does not detect the compensating means", and there can be listed up, for example, the case that the working machine is not installed to the working vehicle, the case that the working machine ECU 21 is not connected to the ECU 11, and the like. Further, as the state in which the response of the working machine ECU 21 does not exist, there can be thought, for example, the case that the correction characteristic map M2 is not stored in the working machine ECU 21, the case that the communication can not be achieved, and the like.

As shown in FIG. 1 and FIG. 2, an engine control apparatus of the embodiment is shipped from an engine manufacturer in a state in which the output characteristic map M1 is written in the ECU 11. The engine purchasing manufacturer connects the working machine ECU 21 which stores the correction characteristic map M2, to the ECU 11 via the CAN communication bus 23, at a time of mounting the diesel engine 70 to the working vehicle.

A description will be given below of an example of the fuel injection control in the first embodiment with reference to a flow chart in FIG. 6. As mentioned above, the ECU 11 of the first embodiment computes the torque T on the basis of the detection values of the engine speed sensor 14 and the throttle position sensor 16, the output characteristic map M1, and the correction characteristic map M2 so as to determine the target fuel injection amount R, and actuates the common rail apparatus 117 (in such a manner as to limit the torque T with respect to the predetermined rotating speed N) on the basis of the result of computation because it connects the working machine ECU 21. In this case, as shown in the flow chart in FIG. 6, the ECU 11 discriminates with or without the connection of the working machine ECU 21 (whether a wiring to the working machine ECU 21 exists) (a step S1). If the working machine ECU 21 is not connected (S1: NO), it reads the detection values of the engine speed sensor 14 and the throttle position sensor 16 at a predetermined timing (per an appropriate time) (a step S2), and the ECU 11 next refers to the output characteristic map M1 included in itself, and determines the torque T from the rotating speed N and the throttle position which are previously read therein so as to compute the target fuel injection amount R (a step S3). Further, it actuates the common rail apparatus 117 on the basis of the target fuel injection amount R (a step S4). Thereafter, if a key switch (an illustration of which is omitted) for applying a power supply is in an on state, it goes back to the step S1 and carries on the fuel injection control.

In the step S1, if the working machine ECU 21 is connected (S1: YES), the ECU 11 next discriminates with or without a response of the working machine ECU 21 (a step S5). If the response of the working machine ECU 21 does not exist (S5: NO), the ECU 11 determines a fail state so as to actuate the informing means 27 (a step S6), informs the operator of the matter that the fuel injection control is in a fail state, and alerts. Further, it goes to the step S2, and executes the fuel injection control using the output characteristic map M1.

In the step S5, if it detects the response of the working machine ECU 21 (S5: YES), it reads the detection values of the engine speed sensor 14 and the throttle position sensor 16 at a predetermined timing (per an appropriate time) (a step S7), and the ECU 11 next refers to the output characteristic map M1 and the correction characteristic map M2 within the working machine ECU 21, determines the torque T from the rotating speed N and the throttle position which are previously read therein, and computes the target fuel injection amount R (which is limited by torque) (a step S8). Further, it actuates the common rail apparatus 117 on the basis of the target fuel injection amount R which is limited by torque (a step S9). Thereafter, if the key switch (an illustration of which is omitted) for applying the power supply is in the on state, it goes back to the step S1 so as to carry on the fuel injection control.

As is apparent from the description mentioned above and FIG. 1 to FIG. 6, in the engine control apparatus provided with the engine 70 which is mounted to the working vehicle, the fuel injection apparatus 117 which injects the fuel to the engine 70, the detecting means 14 and 16 which detect the drive state of the engine 70, and the ECU 11 which controls the actuation of the fuel injection apparatus 117 on the basis of the detection information of the detecting means 14 and 16 and the specific output characteristic data M1 of the engine 70, the compensating means 21 for compensating the output characteristic data M1 is provided, and the ECU 11 is structured such as to compute the limit torque value on the basis of the result of compensation of the output characteristic data M1 by the compensating means 21 and the detection information of the detecting means 14 and 16, and actuate the fuel injection apparatus 117 in correspondence to the limit torque value. Accordingly, the engine manufacturer can make all the output characteristic data M1 stored in the ECU 11 identical (in common) as long as the type of the engine 70 is the same. Further, the engine purchasing manufacturer that mounts the engine 70 to the working vehicle can obtain the result of compensation which complies with its own specification from the compensating means 21. In other words, it is possible to select an optimum fuel injection control per kind of vehicle to which the engine 70 is mounted, and per working machine which is installed to the working vehicle, by the compensating means 21. Therefore, there can be achieved such an effect that can accomplish both an advantage of the engine manufacturer, that is, an improvement of a general purpose property of the ECU 11, and an advantage of the engine purchasing manufacturer, that is, a reservation of compatibility of the ECU 11 with respect to the working vehicle.

As is apparent from the description mentioned above and FIG. 1 to FIG. 6, since the data storage means 21 serving as the compensating means stores the correction characteristic data M2 for correcting the actuation of the fuel injection apparatus 117, and the ECU 11 computes the result of compensation of the output characteristic data M1 on the basis of the correction characteristic data M2, in correspondence to the setting of the identifying means 25 in association with the correction characteristic data M2, it is possible to compensate the output characteristic data M1 by using the correction characteristic data M2 so as to limit the torque of the engine 70 on the basis of the result of compensation as long as the identifying means 25 is set. Therefore, there can be obtained such an effect that it is possible to execute the fuel injection control which is compensated in conformity to the specification of the engine purchasing manufacturer, without troubling the operator (without depending on a degree of skill or the like).

As is apparent from the description mentioned above and FIG. 6, since the ECU 11 is structured such as to actuate the fuel injection apparatus 117 on the basis of the detection information of the detecting means 14 and 16 and the output characteristic data M1 in the case that it does not detects the compensating means 21, a fail safe function using the output characteristic data M1 works even if a trouble, for example, a malfunction, an erroneous motion or the like of the compensating means 21 is generated and it is impossible to detect the compensating means 21. Therefore, there can be achieved such an effect that it is possible to avoid a matter that the ECU 11 erroneously operates or stops, and the engine 70 erroneously operates or stops.

As is apparent from the description mentioned above and FIG. 6, since the ECU 11 is structured such as to determine the fail state in the case that the compensating means 21 does not respond under the state in which the wiring to the compensating means 21 is connected so as to actuate the informing means 27 which informs of the matter, for example, in the case that the compensating means 21 to which the correction characteristic data M2 is not input is erroneously connected to the ECU 11, and in the case that a disconnection is generated between the ECU 11 and the compensating means 21, such a fact can be comprehended by an actuation of the informing means. Therefore, there can be achieved such an effect that it is possible to avoid a risk of failing to store the correction characteristic data M2 in the compensating means 21, or overlooking a disconnection in the wiring.

As is apparent from the description mentioned above and FIG. 5, since each of the characteristic data M1 and M2 is the data which indicates the relationship between the rotating speed N and the torque T in the engine 70, and the correction characteristic data M2 is set in such a manner as to limit the torque T with respect to the predetermined rotating speed N in comparison with the output characteristic data M1, the fuel injection is held down in the fuel injection control using the correction characteristic data M2, in comparison with the fuel injection control using the output characteristic data M1. Therefore, there can be achieved such an effect that it is possible to cope with an exhaust gas regulation by one kind of ECU 11 so as to take into account an environmental pollution with respect to the one type of engine 70, in spite that the optimum fuel injection control can be selected per the kind of vehicle to which the engine 70 is mounted, and per the working machine which is installed to the working vehicle, by the data storage means 21 which serves as the correction means.

Figure 6:
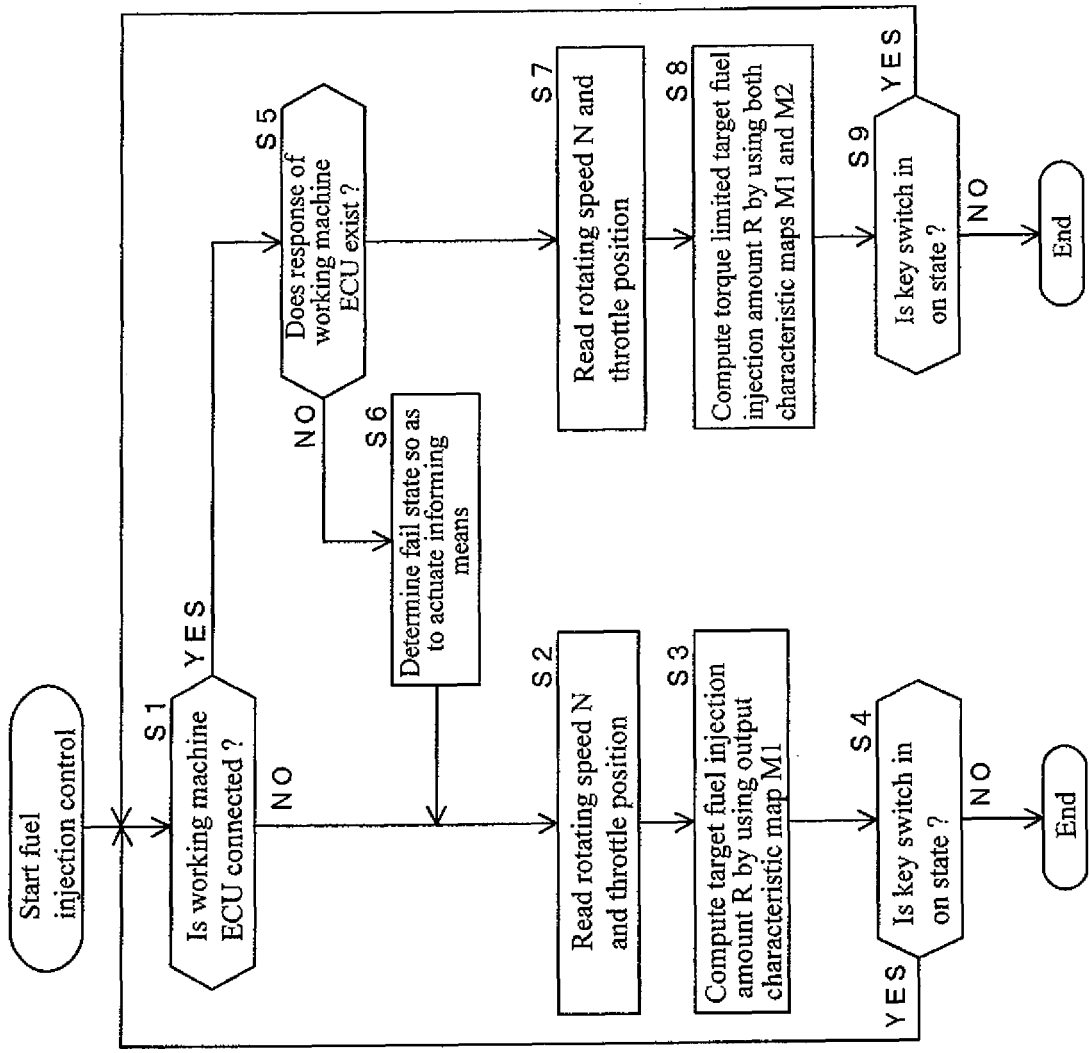
FIG. 6 is a flow chart of a fuel injection control.

The determination in the step S1 shown in FIG. 6, that is, the determination of with or without the connection of the working machine ECU 21 is in common with the determination whether the working machine is installed to the working vehicle. Since the working vehicle which does not install the working machine is assumed in a state of executing a normal travel such as a road travel without executing various works such as a farm work, it is not necessary to allow itself to use such a correction characteristic map M2 as to comply with the working characteristic, but it is sufficient to carry out the fuel injection control by using the originally provided output characteristic map M1. Accordingly, as shown in the steps S1 to S4 in FIG. 6, the ECU 11 actuates the common rail apparatus 117 on the basis of the detection values of the engine speed sensor 14 and the throttle position sensor 16 and the output characteristic map M1, in the case that the working machine is not installed to the working vehicle. Therefore, it is possible to easily execute an efficient fuel injection control in correspondence to with or without the installation of the working machine (a used condition of the working vehicle), without a detailed setting operation or the like.

(3) Fuel Injection Control of Common Rail in Second Embodiment

Next, a description will be given of a fuel injection control of a common rail 120 of a second embodiment with reference to FIG. 7 to FIG. 9. In this case, in the following embodiments to the second embodiment, the same reference numerals as those of the first embodiment are attached to elements structures and operations of which are not changed from the first embodiment, and a detailed description thereof will be omitted.

Figure 9:
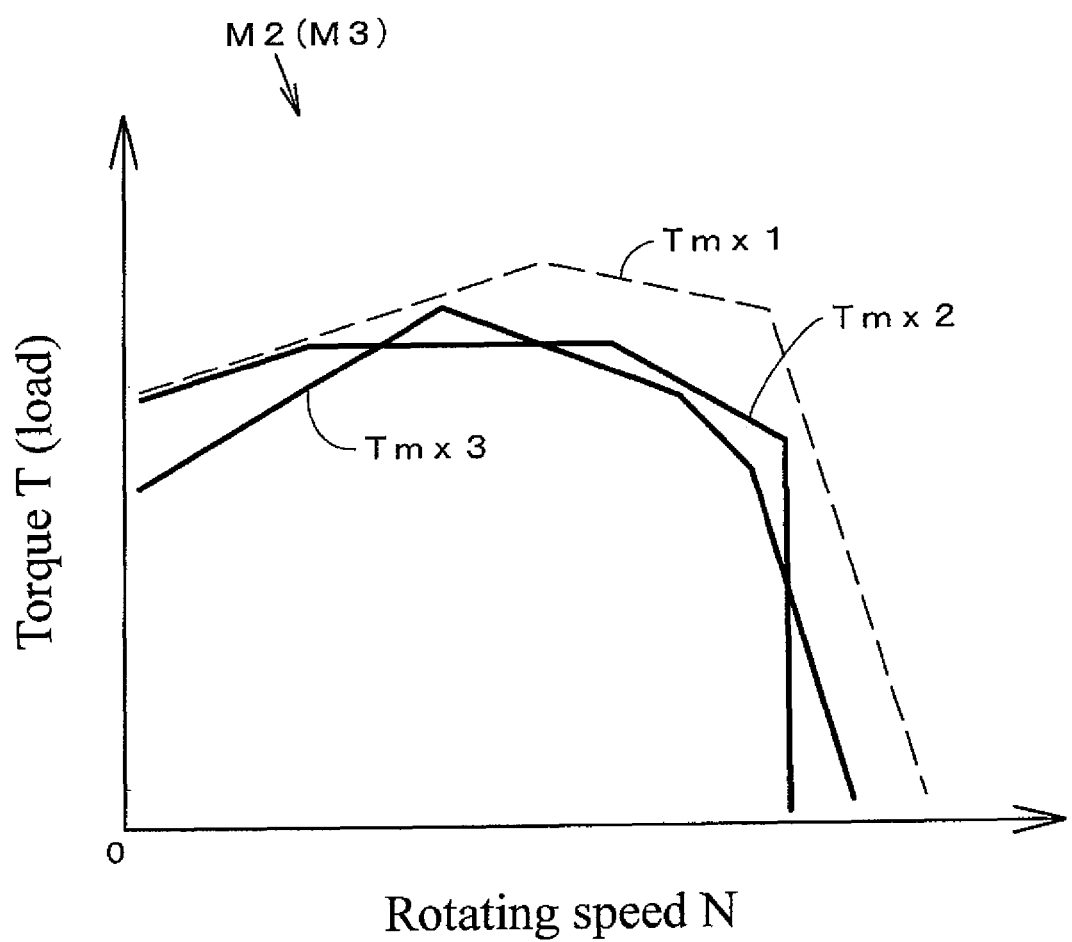
FIG. 9 is an explanatory view showing a relationship between a rotating speed and a torque.

In this case, the correction characteristic data for correcting the actuation of the common rail apparatus 117 are not limited to one kind as shown in FIG. 5, but plural kinds of data may be stored in correspondence to the kind of vehicle to which the diesel engine 70 is installed, and the working machine (the power tiller, the plow, the bucket or the like) which is installed to the working vehicle (refer to FIG. 9). In the second embodiment, plural kinds of correction characteristic maps M2 and M3 are stored in the working machine ECU 21 which serves as the data storage means. In this case, a selection of each of the correction characteristic maps M2 and M3 may be carried out, for example, by a jumper pin which is provided in the ECU 11, or a select switch which is provided in a cabin of the working vehicle. Further, the structure may be made such that each of the characteristic maps M2 and M3 may be selected by a control signal from the different ECU (the working machine ECU 21 in this case) which is provided in both sides of the working vehicle.

Figure 7:
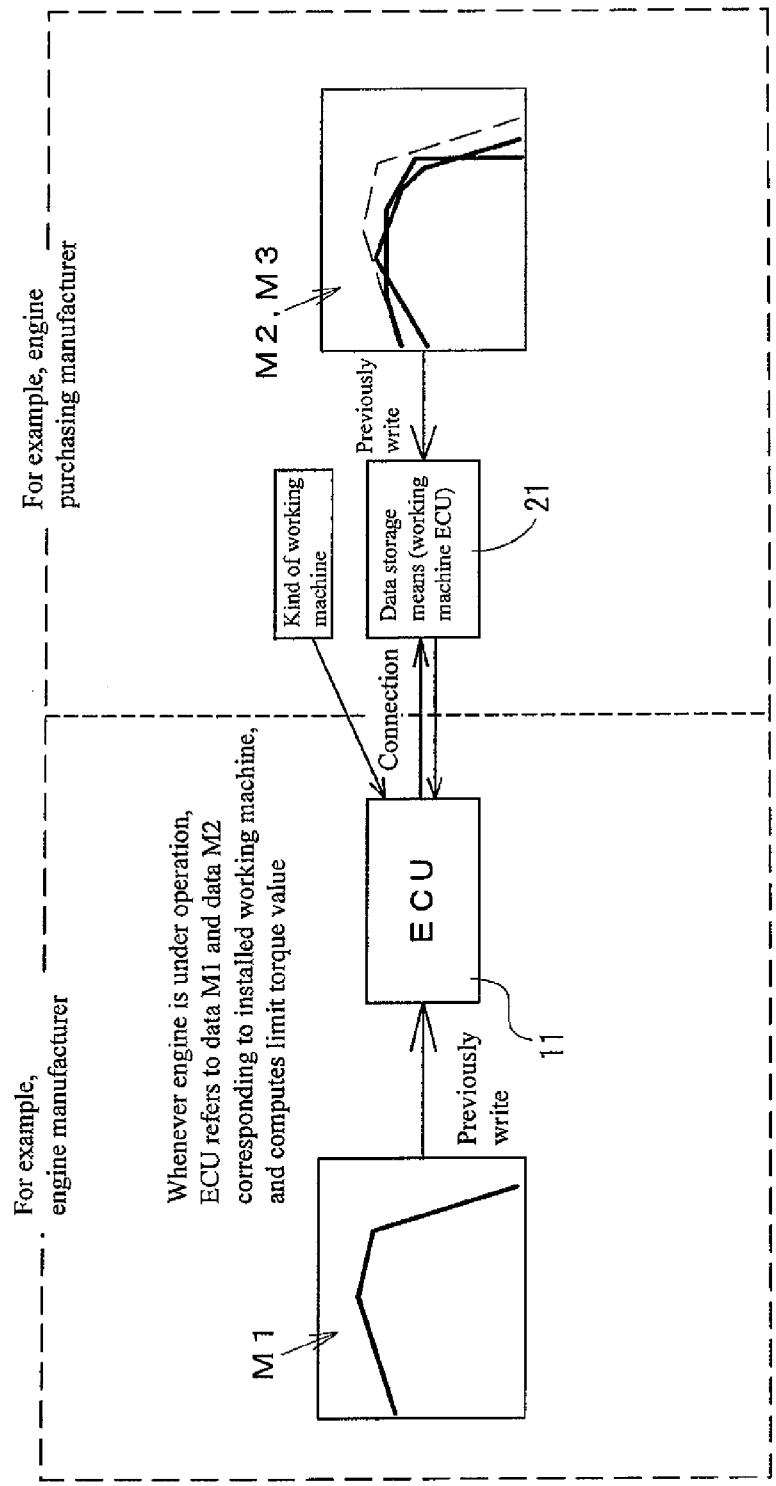
FIG. 7 is an explanatory view of a concept and summarizes a second embodiment.
Figure 8:
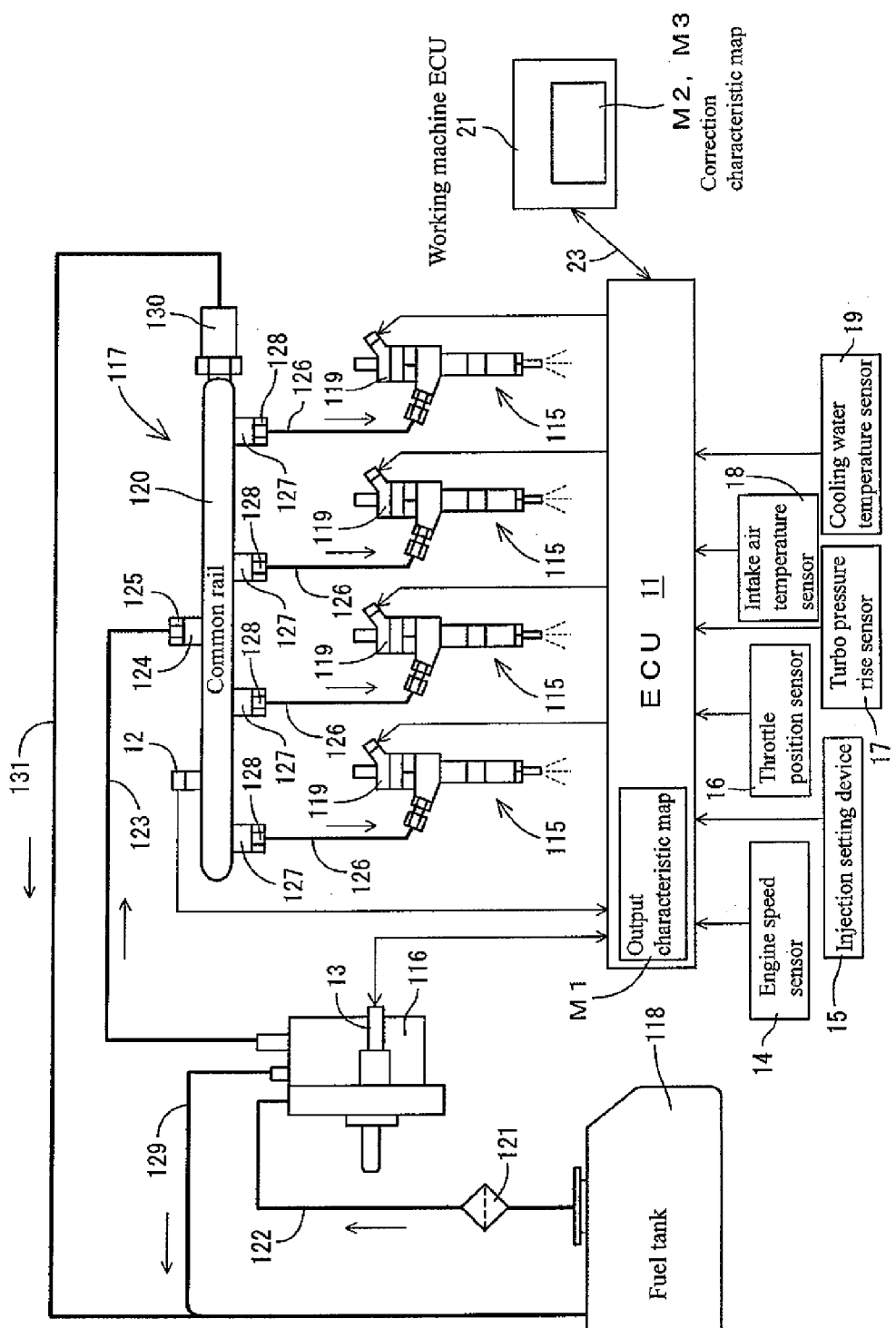
FIG. 8 is an explanatory view of a fuel system of a diesel engine.

The second embodiment is structured such as to select the correction characteristic maps M2 and M3 corresponding to the working machine, by installing the working machine to the working vehicle (refer to FIG. 7 and FIG. 8). For example, a discriminating button per working machine may be arranged in a vehicle side hitch which is provided in a rear portion of the working vehicle, and the discriminating button corresponding to the working machine may be structured such as to be set by connection at a time when the working machine side hitch is connected to the vehicle side hitch. In this case, on the assumption that the correction characteristic map M2 is provided for a rotary power tiller, and the correction characteristic map M3 is provided for a plow, the discriminating button for the power tiller is set in the case that the rotary power tiller is installed, and the ECU 11 refers to the correction characteristic map M2 for the rotary power tiller, in order to compensate the output characteristic map M1. In the case that the plow is installed, the discriminating button for the plow is set, and the ECU 11 refers to the correction characteristic map M3 for the plow, in order to compensate the output characteristic map M1.

The ECU 11 of the second embodiment decides the correction characteristic map M2 or M3 which is read from the working machine ECU 21, in correspondence to the working machine which is installed to the working vehicle, and computes the result of compensation of the output characteristic map M1 on the basis of the correction characteristic map M2 or M3. Further, it computes the torque T on the basis of the result of compensation of the output characteristic map M1, and the detection values of the engine speed sensor 14 and the throttle position sensor 16 so as to determine the target fuel injection amount R, and actuates the common rail apparatus 117 (in such a manner as to limit the torque T with respect to the predetermined rotating speed N) on the basis of the result of computation.

As is apparent from the description mentioned above and FIG. 7 to FIG. 9, since the data storage means 21 serving as the compensating means stores a plurality of correction characteristic data M2 and M3 in correspondence to the kind of working machines which are installable to the working vehicle, and the ECU 11 decides the correction characteristic data M2 or M3 read out of the data storage means 21 in correspondence to the working machine which is installed to the working vehicle, and computes the result of compensation of the output characteristic data M1 on the basis of the correction characteristic data M2 or M3, the ECU 11 can extract the correction characteristic data M2 or M3 (for the working machine) which is suitable for the working machine, as long as the working machine is installed to the working vehicle. Therefore, it is possible to specify and select the correction characteristic data M2 or M3 for the working machine accurately without troubling the operator. In other words, there can be obtained such an effect that it is possible to accurately execute an optimum fuel injection control per the working machine, for example, without depending on the degree of skill of the operator or the like, in spite that it is possible to secure a flexible setting of the ECU 11 with respect to the fuel injection control.

(4) Fuel Injection Control of Common Rail in Third Embodiment

Figure 10:
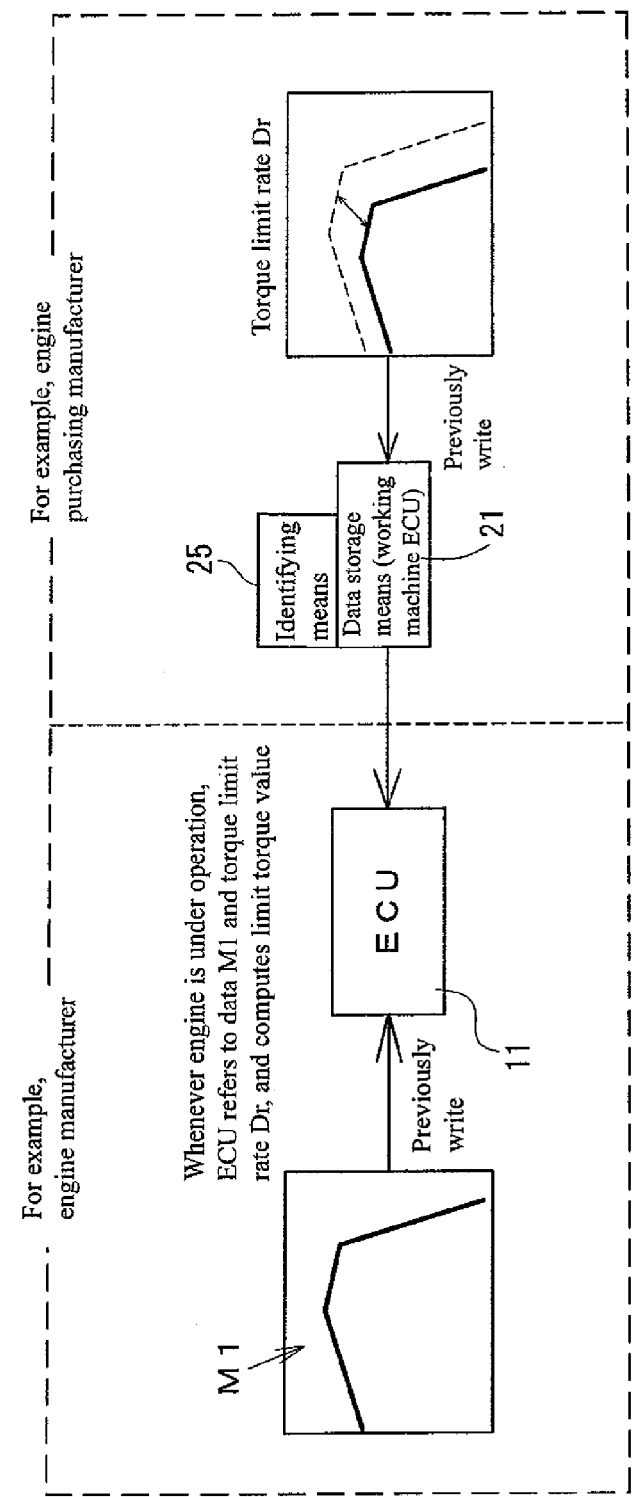
FIG. 10 is an explanatory view of a concept and summarizes a third embodiment.
Figure 11:
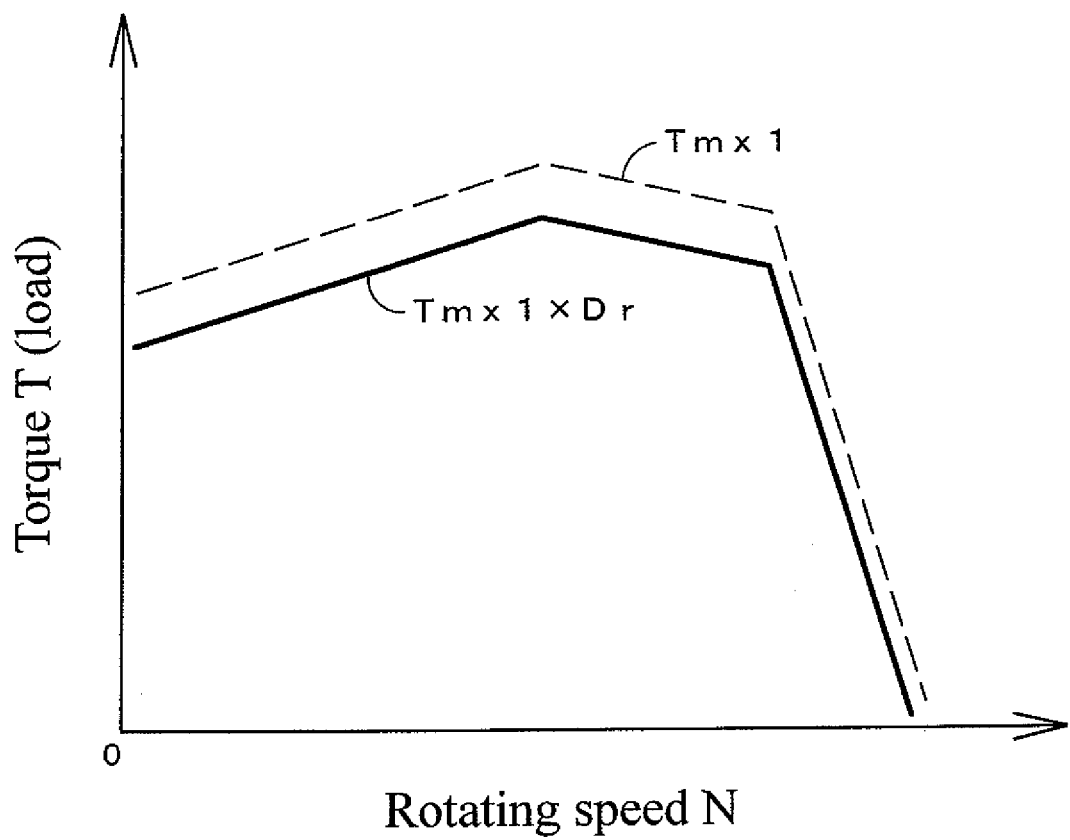
FIG. 11 is an explanatory view showing a relationship between a rotating speed and a torque.
Figure 12:
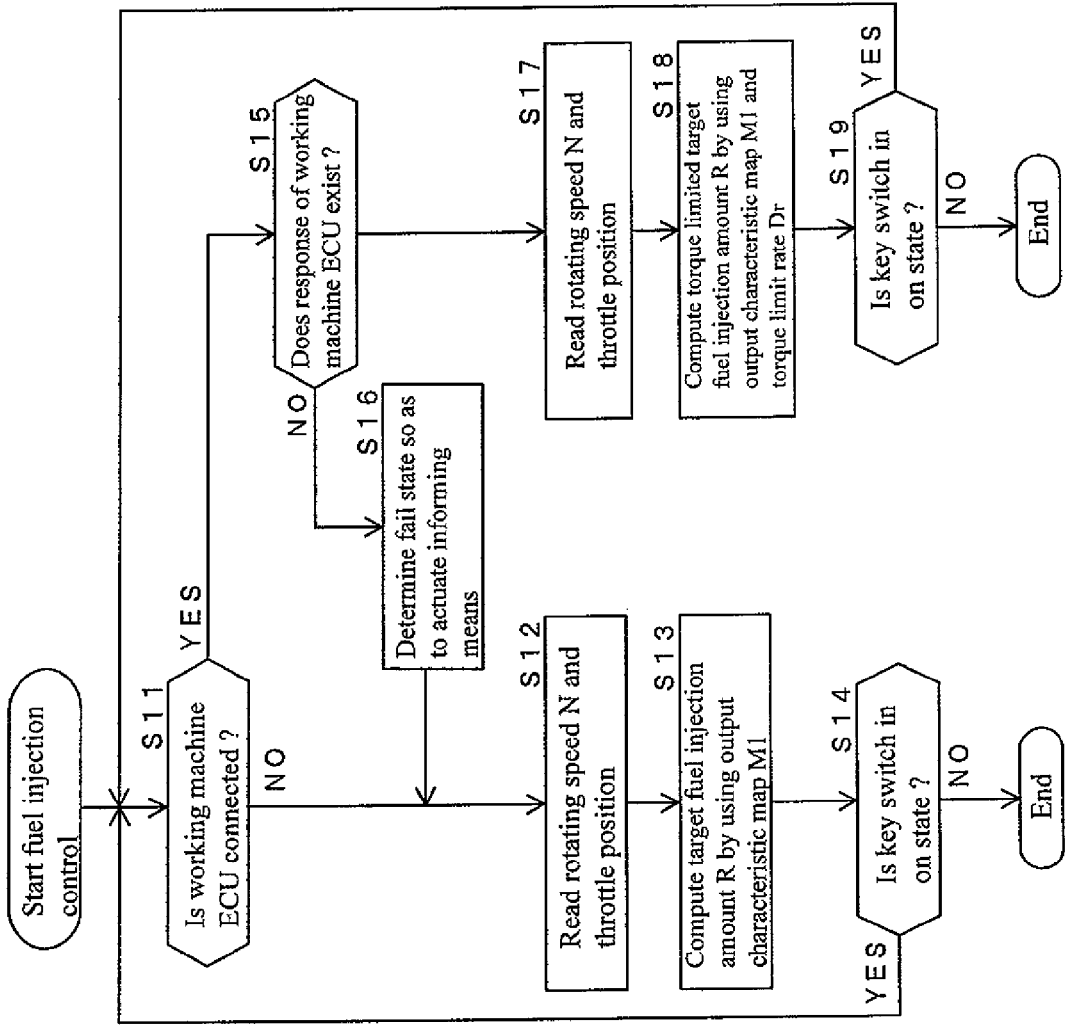
FIG. 12 is a flow chart of a fuel injection control.

Next, a description will be given of a fuel injection control of a common rail 120 of a third embodiment with reference to FIG. 10 to FIG. 12. As mentioned above, it goes without saying that the correction characteristic data is not limited to the map types M2 and M3, the function table and the like, however, for example, it is possible to employ a torque limit rate Dr which is stored in the working machine ECU 21 (the data storage means) as the correction characteristic data, in place of the correction characteristic maps M2 and M3 mentioned above (refer to FIG. 10 to FIG. 12). In the case of the third embodiment, a control flow shown in FIG. 12 is basically the same as that of the case in FIG. 6, however, at a time of computing the target fuel injection amount R, the ECU 11 refers to the torque limit rate Dr within the working machine ECU 21, and executes a computation on the basis of the rotating speed N and the throttle position, the output characteristic map M1, and the torque limit rate Dr.

As is apparent from the description mentioned above and FIG. 10 to FIG. 12, since the data storage means 21 serving as the compensating means stores the torque limit rate Dr which limits the torque T with respect to the predetermined rotating speed N in the output characteristic data M1, and the ECU 11 computes the result of compensation of the output characteristic data M1 on the basis of the torque limit rate Dr, it is possible to maintain a droop characteristic of the correction characteristic data on the basis of the compensation of the engine purchasing manufacturer in a similar shape of a droop characteristic of the output characteristic data M1, and it is possible for the engine manufacturer to drive the engine 70 in a state which is close to its own design concept. Further, for the engine purchasing manufacturer, it is possible to execute the fuel injection control which complies with its own specification on the basis of a simple setting of the correction characteristic data to the torque limit rate Dr, and there can be achieved such an effect that it is possible to lighten a burden of a software design (a correction characteristic data design) which takes a lot of trouble.

Figure 13:
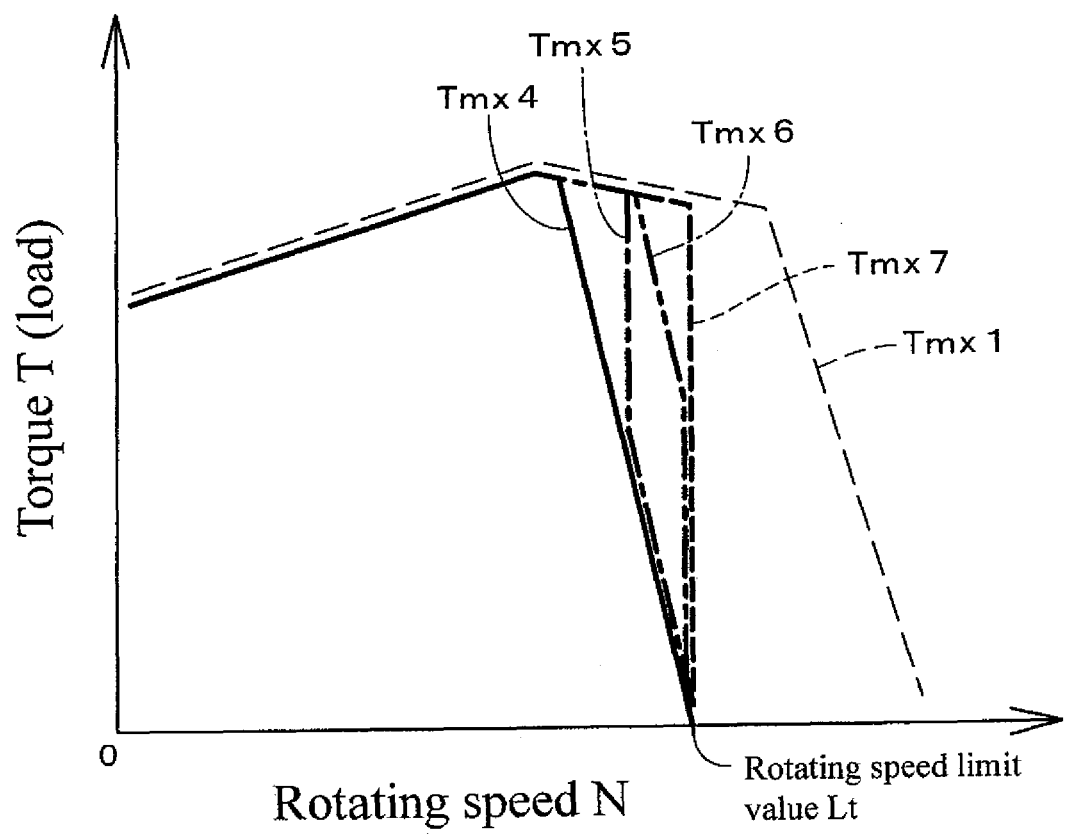
FIG. 13 is an explanatory view showing a relationship between a rotating speed and a torque.

Further, as a different example of the third embodiment, it is possible to employ a rotating speed limit value Lt which is stored in the working machine ECU 21 as the correction characteristic data (refer to FIG. 13). In the case of the different example mentioned above, at a time of computing the target fuel injection amount R, the ECU 11 refers to the rotating speed limit value Lt within the working machine ECU 21, and executes a computation on the basis of the rotating speed N and the throttle position, the output characteristic map M1, and the rotating speed limit value Lt. In accordance with the structure mentioned above, for the engine purchasing manufacturer, it is possible to execute the fuel injection control which complies with its own specification, only by setting the correction characteristic data to the rotating speed limit rate Lt, and there can be achieved such an effect that it is possible to lighten a burden of a software design (a correction characteristic data design) which takes a lot of trouble. In FIG. 13, a solid line Tmx4 shows a maximum torque line (a droop characteristic) in the case of setting the rotating speed set value Lt. In this case, it is possible to change like the droop characteristics Tmx5 to Tmx7 shown in FIG. 13, by sending a confirmation signal changing the droop characteristic in addition to the rotating speed limit value Lt to the ECU 11. In other words, it is possible to easily set a variation of the droop characteristic on the basis of the rotating speed limit value Lt, and it becomes easy to cope with the various settings of the fuel injection control.

In this case, in a different example of the third embodiment, it is possible to structure such that if the ECU 11 determines that the rotating speed limit value Lt is stored within the working machine ECU 21 at a time of starting the diesel engine 70, it immediately computes the target fuel injection amount R by using the rotating speed limit value Lt so as to actuate the common rail apparatus 117.

Further, it is possible to structure such that a variable resister type rotating speed limit switch (an illustration of which is omitted) is employed as the compensating means, and the droop characteristic of the correction characteristic map (the result of compensation) is changed and regulated by changing the rotating speed limit value Lt in stages or continuously on the basis of a picking operation of the rotating speed limit switch.

Figure 14:
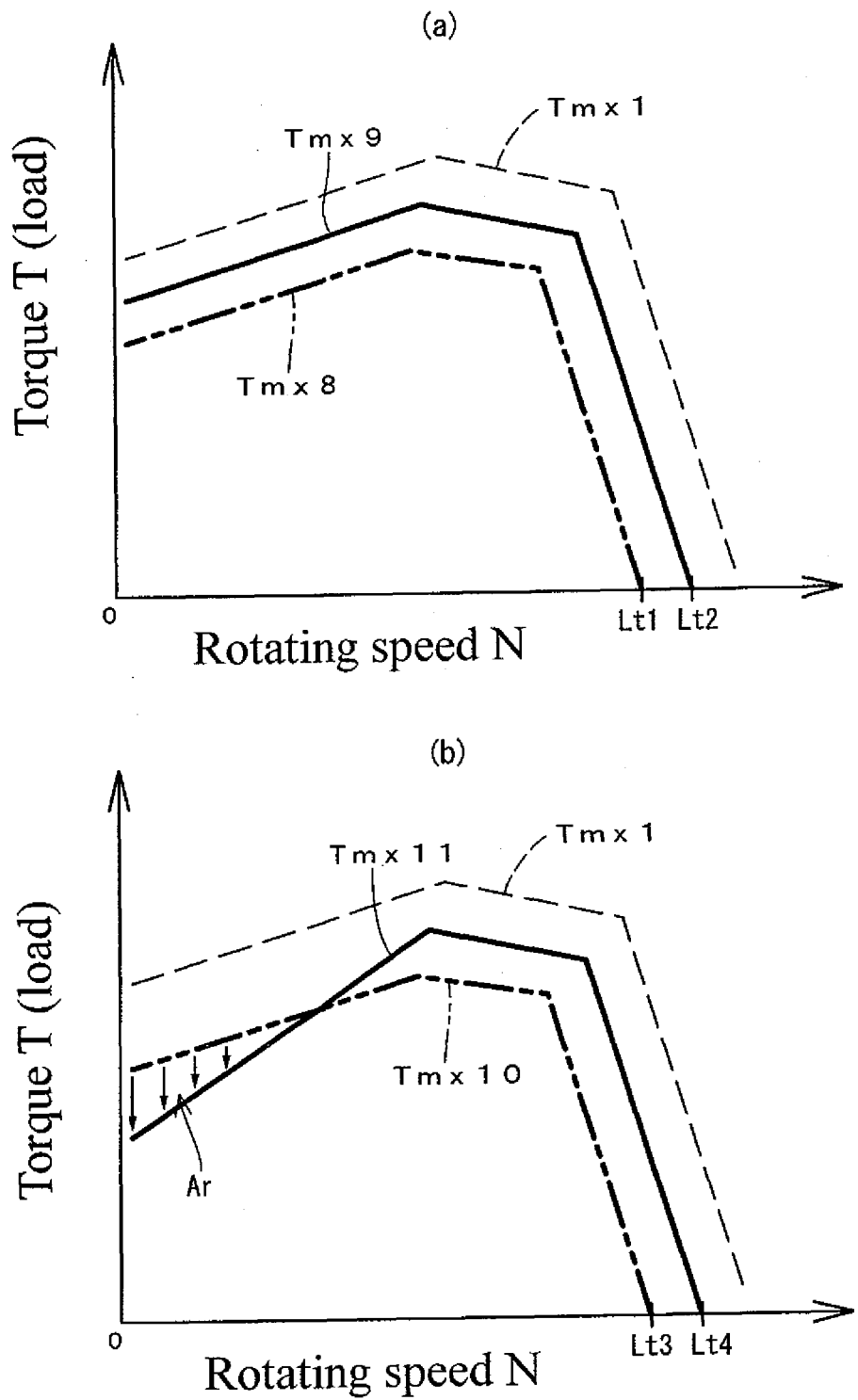

For example, in the case that the operator operates the rotating speed limit switch during the drive of the diesel engine 70, if a droop characteristic Tmx9 on the basis of the rotating speed limit value Lt2 after the operation moves to an upper side (an outer side) as a whole, in comparison with a droop characteristic Tmx8 on the basis of the rotating speed limit vale Lt1 before the operation, as shown in FIG. 14(a), it is preferable to immediately compute the target fuel injection amount R by using the rotating speed limit value Lt2 (the droop characteristic Tmx9) so as to actuate the common rail apparatus 117.

On the other hand, in the other cases, for example, in the case that a droop characteristic Tmx11 on the basis of the rotating speed limit value Lt4 after the operation intersects partly a droop characteristic Tmx10 on the basis of the rotating speed limit value Lt3 before the operation, as shown in FIG. 14(b), it is preferable to compute a difference so as to approximate the rotating speed limit value Lt4 (the droop characteristic Tmx11) little by little, and finally compute by the rotating speed limit value Lt4. This is a step for preventing such a risk that the diesel engine 70 rapidly stops due to the change of the droop characteristic under such a condition that an upper limit of the droop characteristic is lowered by the operation of the rotating speed limit switch (refer to an area Ar in FIG. 14(b)).

(5) Fuel Injection Control of Common Rail in Fourth Embodiment

Figure 15:
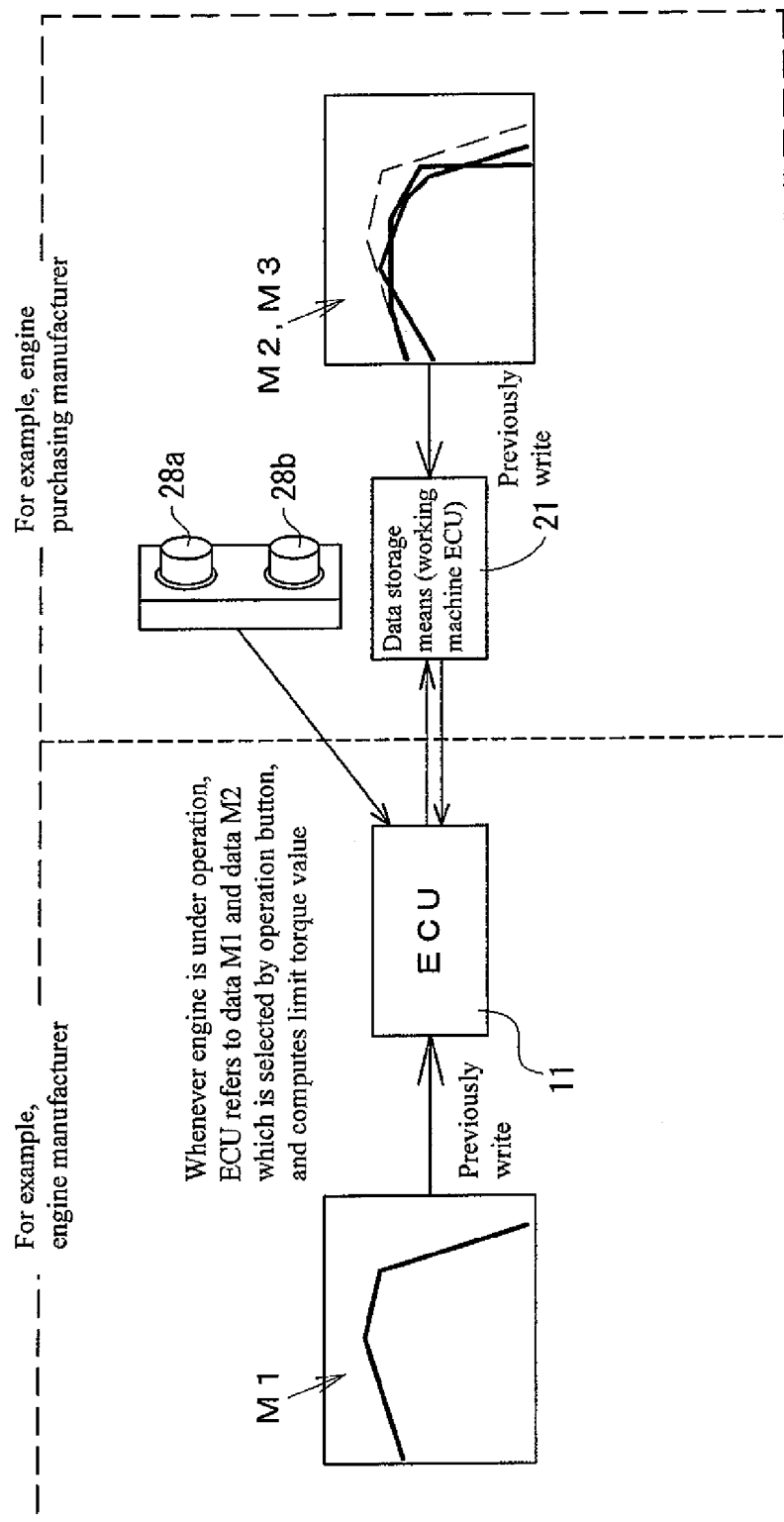
FIG. 15 is an explanatory view of a concept and summarizes a fourth embodiment.
Figure 16:
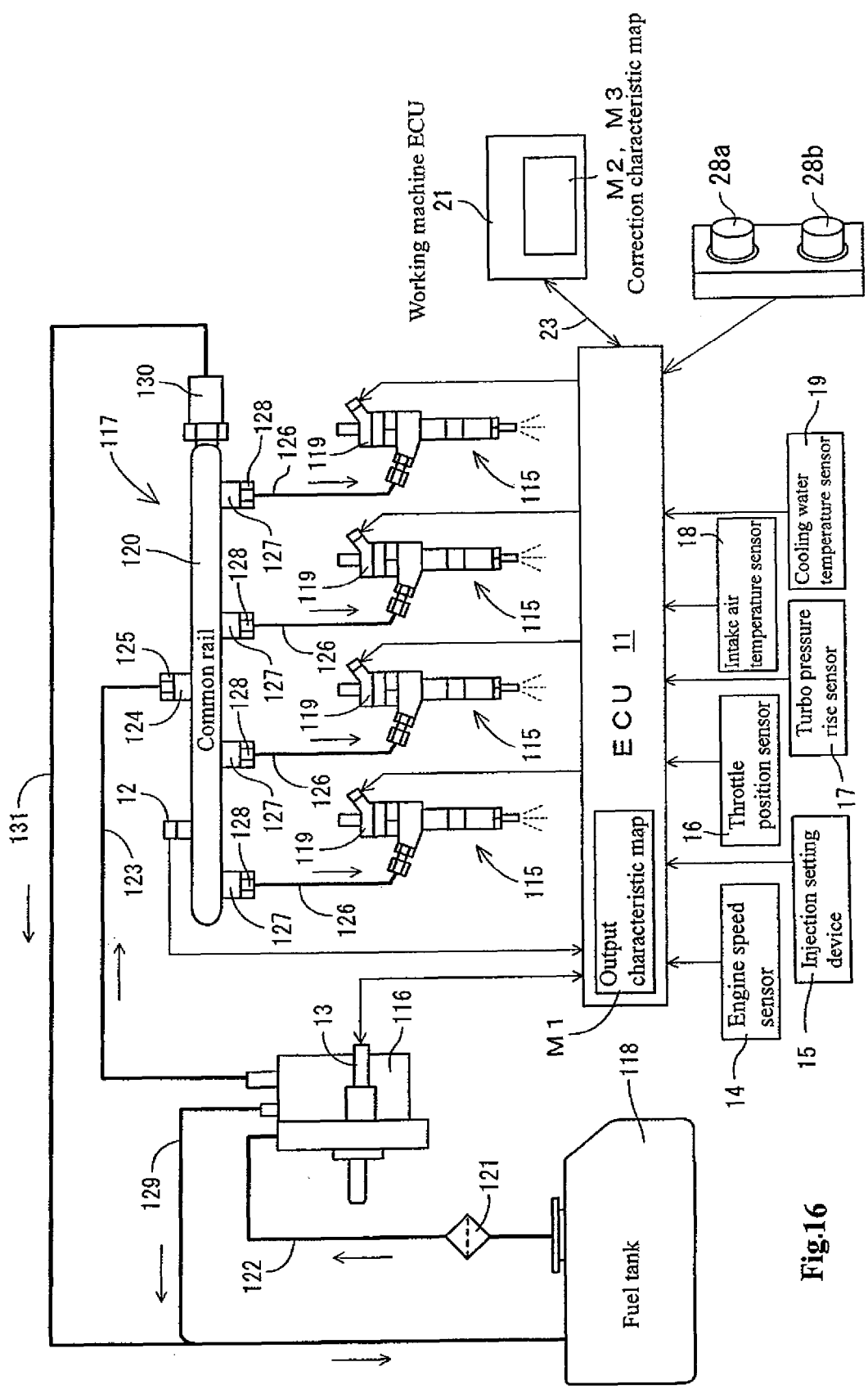
FIG. 16 is an explanatory view of a fuel system of a diesel engine.

Next, a description will be given of a fuel injection control of a common rail 120 in a fourth embodiment with reference to FIG. 15 and FIG. 16. In the fourth embodiment, in the same manner as the second embodiment, plural kinds of correction characteristic maps M2 and M3 shown in FIG. 9 are stored in the working machine ECU 21 serving as the data storage means. In this case, operation buttons 28a and 28b which are associated with the respective correction characteristic maps M2 and M3 are provided as select switch means within the cabin of the working vehicle (refer to FIG. 15 and FIG. 16). On the basis of a selecting operation of the operation buttons 28a and 28b, the correction characteristic map M2 or M3 which is read out of the working machine ECU 21 is selected. Each of the operation buttons 28a and 28b is structured as a push switch which is locked once it is pushed down so as to make the ECU 11 select the corresponding correction characteristic map M2 or M3, and is returned to the original position if it is pushed down once more so as to cancel the selection by the ECU 11. Each of the operation buttons 28a and 28b is connected to an input side of the ECU 11 (refer to FIG. 16).

The ECU 11 of the fourth embodiment decides the correction characteristic map M2 or M3 which is read out of the working machine ECU 21, on the basis of the selecting operation of each of the operation buttons 28a and 28b serving as the select switch means, and computes the result of compensation of the output characteristic map M1 on the basis of the correction characteristic map M2 or M3. Further, it computes the torque T on the basis of the result of compensation of the output characteristic map M1, and the detection values of the engine speed sensor 14 and the throttle position sensor 16 so as to determine the target fuel injection amount R, and actuates the common rail apparatus 117 (in such a manner as to limit the torque T with respect to the predetermined rotating speed N) on the basis of the result of computation.

As is apparent from the description mentioned above and FIG. 15 and FIG. 16, since the data storage means 21 serving as the compensating means stores a plurality of correction characteristic data M2 and M3, and the ECU 11 decides the correction characteristic data M2 or M3 read out of the data storage means 21 by the select switch means 28a and 28b which is provided in the working vehicle, and computes the result of compensation of the output characteristic data M1 on the basis of the correction characteristic data M2 and M3, the ECU 11 can select the correction characteristic data which is optimum for the working vehicle to which the engine 70 is mounted, on the basis of the operation of the select switch means 28a and 28b. Therefore, it is possible to easily change the compensation of the output characteristic data M1 in conformity to a working condition and a preference and a desire of the operator, and there can be achieved such an effect that it is possible to execute a suitable fuel injection control in correspondence to the condition.

(6) Fuel Injection Control of Common Rail in Fifth Embodiment

Figure 17:
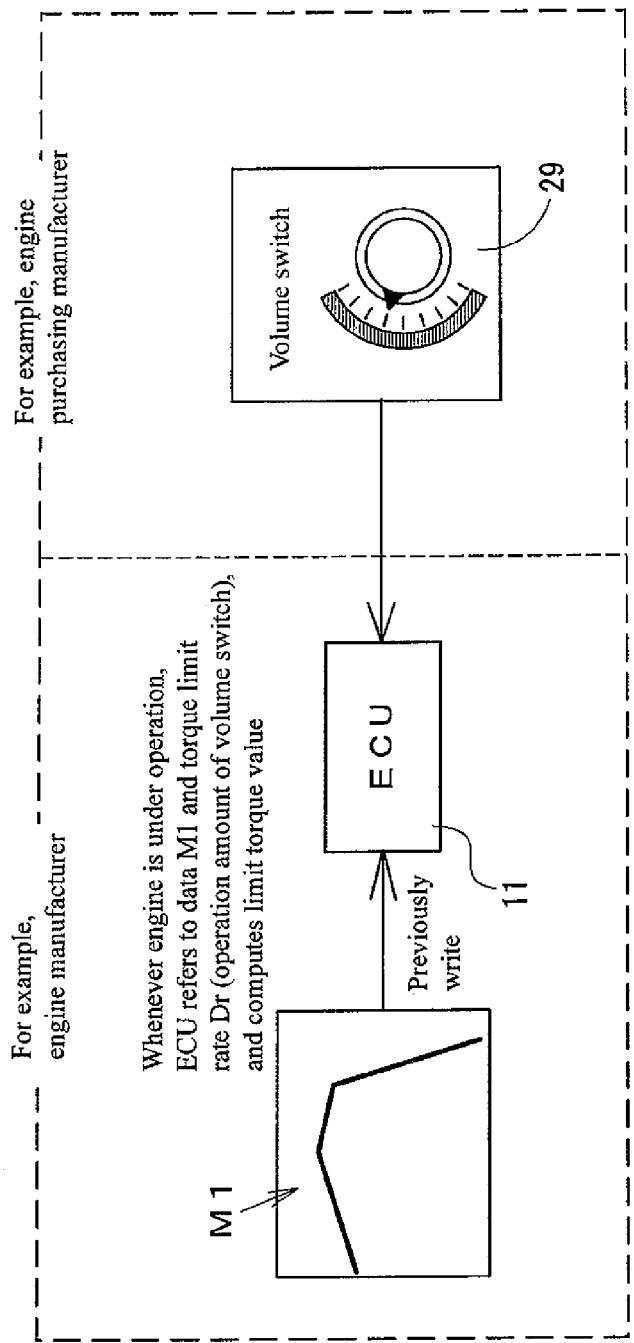
FIG. 17 is an explanatory view of a concept and summarizes a fifth embodiment.
Figure 18:
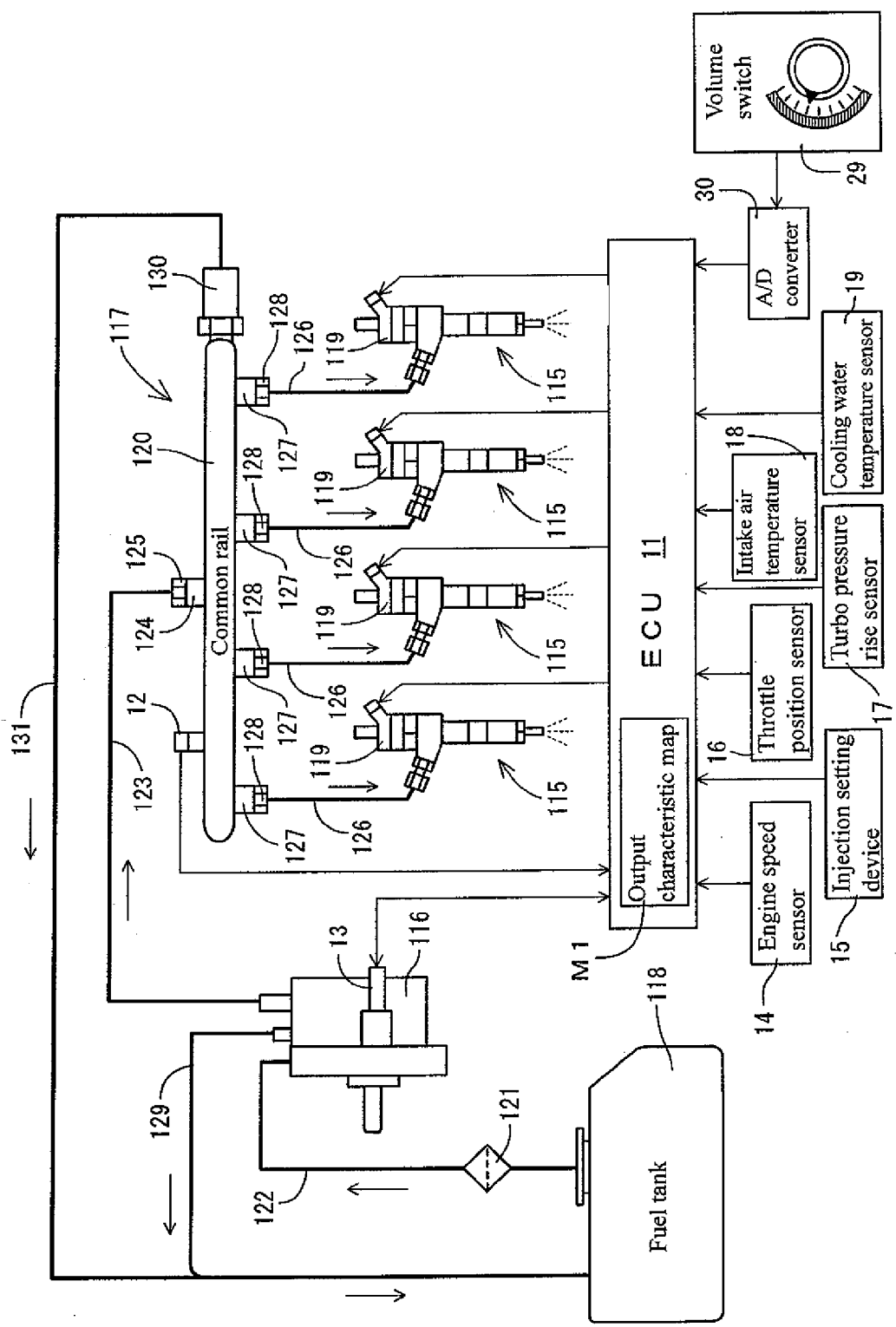
FIG. 18 is an explanatory view of a fuel system of a diesel engine.

Next, a description will be given of a fuel injection control of a common rail 120 in accordance with a fifth embodiment with reference to FIG. 17 and FIG. 18. In the fifth embodiment, it is structured, in the same manner as the third embodiment, such that the torque limit rate Dr is employed as the correction characteristic data, and the ECU 11 computes the result of compensation of the output characteristic data M1 on the basis of the torque limit rate Dr. In this case, the fifth embodiment is not provided with the data storage means, but is provided a variable resister type volume switch 29 which can change a position of a knob continuously or in stages as the compensating means (the manual operating means) within the cabin of the working vehicle. In this case, a value of the torque limit rate Dr is changed in stages or continuously on the basis of a picking operation of the volume switch 29, and it is structured such as to change or regulate the droop characteristic of the correction characteristic map (the result of compensation) in proportion to the torque limit rate Dr, in a state of being maintained in a similar shape of the droop characteristic of the output characteristic map M1. The volume switch 29 of the fifth embodiment is connected to an input side of the ECU 11 via an A/D converter 30 (refer to FIG. 18). At a time of computing the target fuel injection amount R, the ECU 11 refers to the torque limit rate Dr corresponding to the picking operation amount of the volume switch 29, and executes a computation on the basis of the rotating speed N and the throttle position, the output characteristic map M1, and the torque limit rate Dr.

As is apparent from the description mentioned above and FIG. 17 and FIG. 18, since the compensating means is the manual operating means 29 which is provided in the working vehicle, and the manual operating means 29 is structured such as to variably set the torque limit rate Dr which limits the torque T with respect to the predetermined rotating speed N in the output characteristic data M1, the ECU 11 can change and regulate to the correction characteristic data which is optimum for the working vehicle to which the engine 70 is mounted, on the basis of the operation of the manual operating means 29. Therefore, it is possible to change the compensation of the output characteristic data M1 in stages or continuously in conformity to the working condition and the preference and the desire of the operator, and there can be achieved such an effect that it is possible to carry out a careful dealing with respect to the fuel injection control.

(7) Fuel Injection Control of Common Rail in Sixth Embodiment

Next, a description will be given of a fuel injection control of a common rail 120 of a sixth embodiment with reference to FIG. 19 to FIG. 21. In the sixth embodiment, a data ECU 21' substituting for the working machine ECU 21 is electrically connected as the data storage means to the ECU 11 via the CAN communication bus 22. The data ECU 21' is provided with the CPU, the EEPROM, the flush memory, the RAM, the CAN controller, the input and output interface and the like in the same manner as the ECU 11, and can arranged at an optional position of the working vehicle to which the diesel engine 70 is mounted. Of source, it may be arranged in the diesel engine 70 or in the vicinity thereof, together with the ECU 11. The correction characteristic map M2 (refer to FIG. 5) serving as the correction characteristic data for correcting an actuation of the common rail apparatus 117 is previously stored in the memory means (the flush memory and the EEPROM) of the data ECU 21.

In this case, the data storage means having the correction characteristic data is not limited to the working machine ECU 21 and the data ECU 21', but may be constructed by external memory means such as a flush memory, a hard disc or the like, as long as it is different from the ECU 11, and may be constructed by a signal compensation circuit (for example, such a type as to transmit an analog signal to the ECU 11 by utilizing a variable resister) which can variably regulate on the basis of a manual operation.

Figure 19:
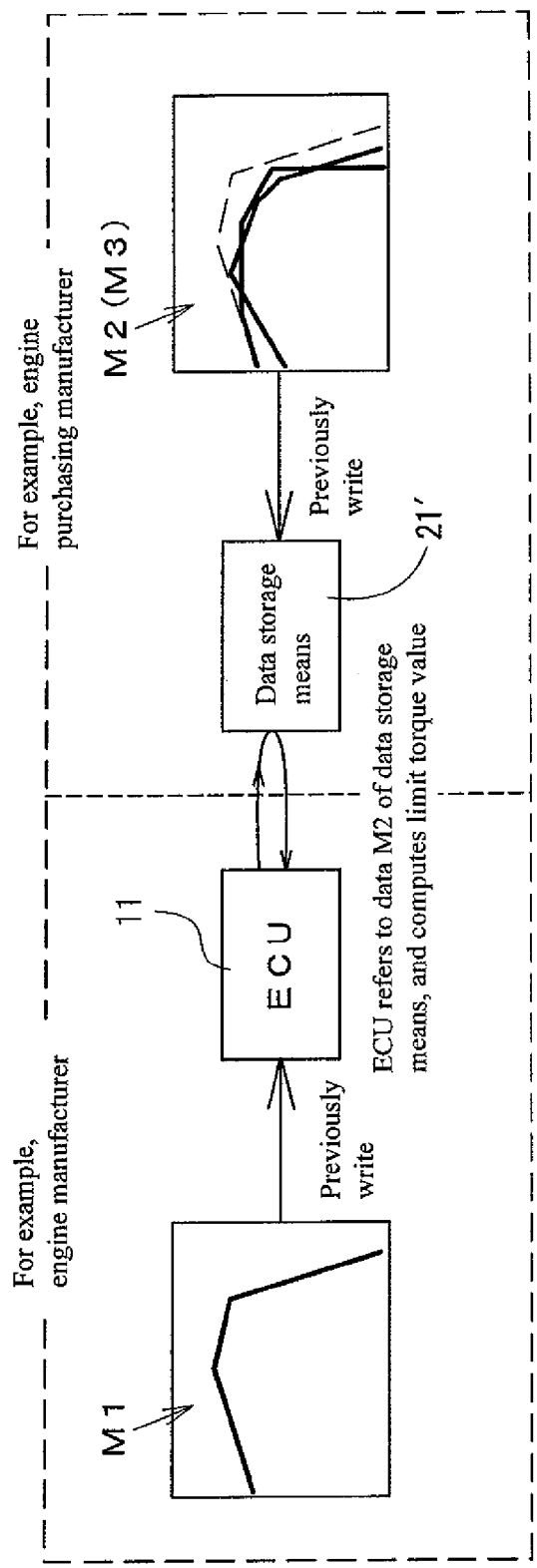
FIG. 19 is an explanatory view of a concept and summarizes a sixth embodiment.
Figure 20:
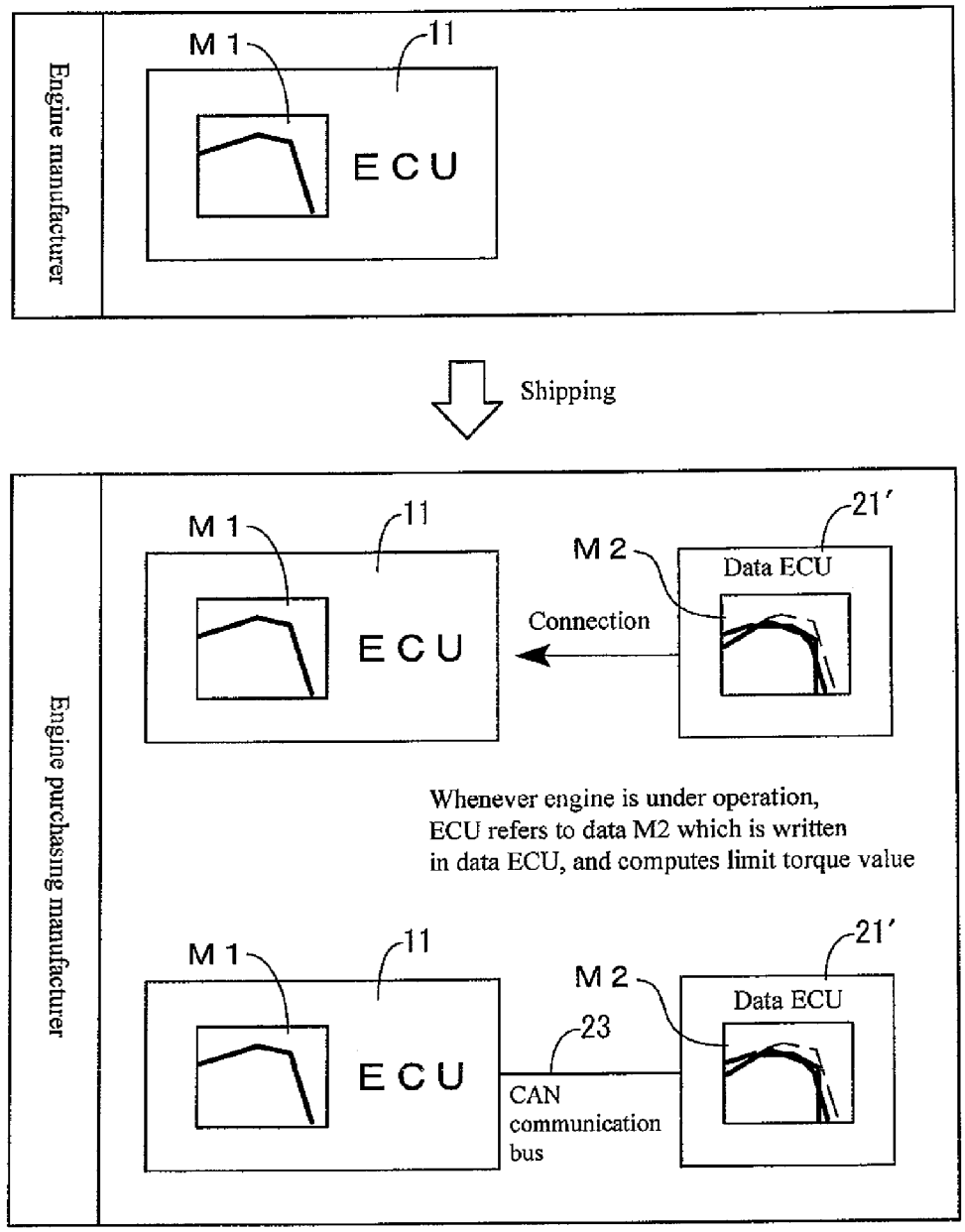
FIG. 20 is an explanatory view of a concept and shows a state of an ECU before and after shipping an engine.
Figure 21:
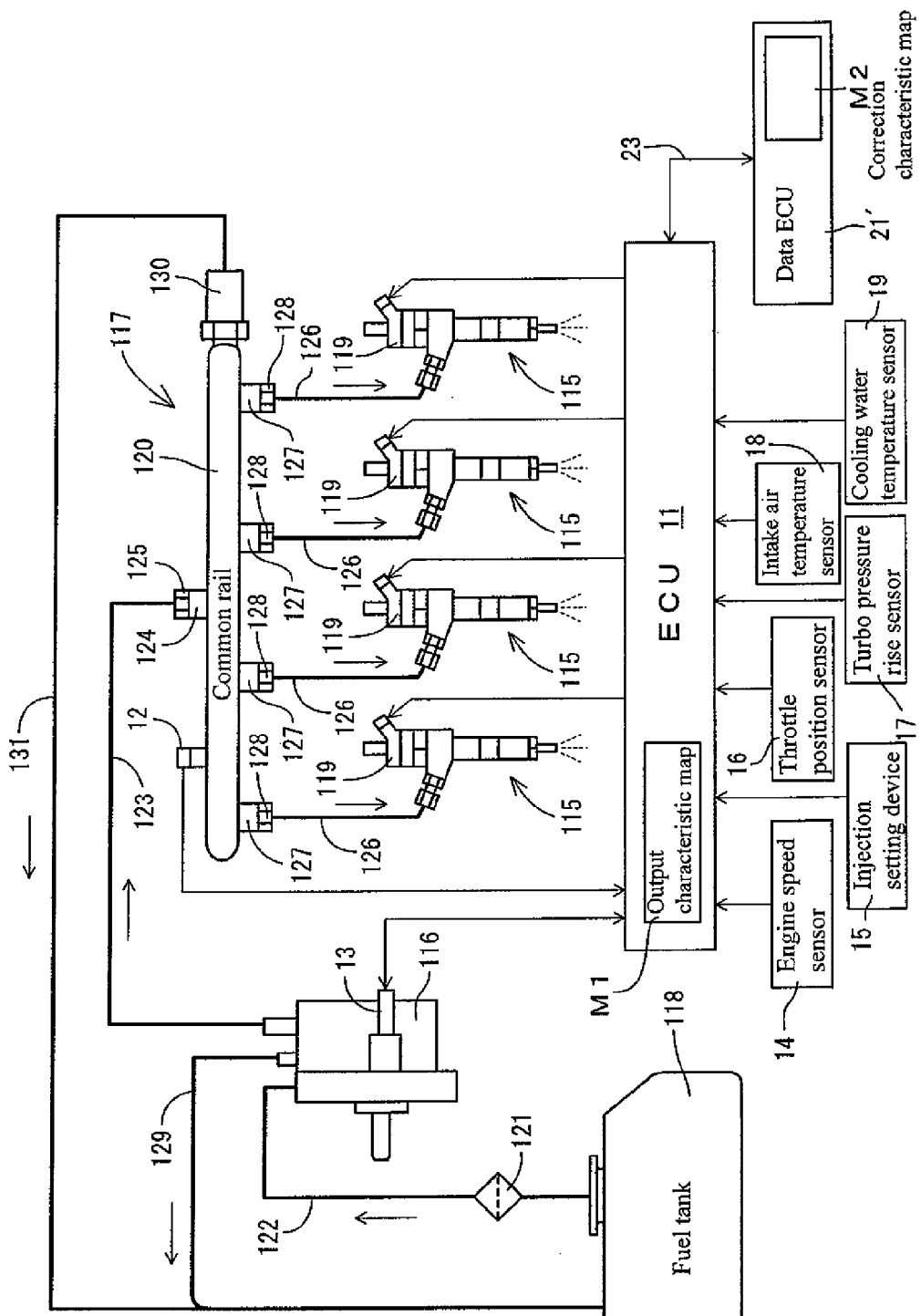
FIG. 21 is an explanatory view of a fuel system of a diesel engine.

The ECU 11 to which the data ECU 21' is connected is structured such as to compute the torque T on the basis of the detection values of the engine speed sensor 14 and the throttle position sensor 16, the output characteristic map M1, and the correction characteristic map M2 so as to determine the target fuel injection amount R, and actuate the common rail apparatus 117 (in such a manner as to limit the torque T with respect to the predetermined rotating speed N) on the basis of the result of computation (refer to FIG. 19 and FIG. 20). In this case, for example, in the case that a function (a numerical expression) or a set data is employed as the correction characteristic data, the limit torque value is determined from the detection values of the engine speed sensor 14 and the throttle position sensor 16, the output characteristic data, and the correction characteristic data so as to determine the target fuel injection amount R, and the common rail apparatus 117 is actuated (in such a manner that the torque T is limited with respect to the predetermined rotating speed N) on the basis of the result of computation.

As is apparent from the description mentioned above, since the data storage means is constructed by the external memory means such as the different data ECU 21' from the ECU 11 of the engine 70 and the memory, or the signal compensation circuit which is variably adjustable by the manual operation, the data storage means has a lot of variations, and there can be achieved such an effect that it is possible to reduce a burden on a design such as a regulation limit or the like, at a time when the engine purchasing manufacturer designs the data storage means. Further, for the engine purchasing manufacturer that mounts the engine 70 to the working vehicle, there is such an advantage that the correction characteristic data M2 which complies with its own specification can be easily attached later to the ECU 11 by using the data storage means 21.

(8) Summary of First to Sixth Embodiments

As is apparent from the description mentioned above, in the engine control apparatus in the present invention provided with the engine 70 which is mounted to the working vehicle, the fuel injection apparatus 117 which injects the fuel to the engine 70, the detecting means 14 and 16 which detect the drive state of the engine 70, and the ECU 11 which controls the actuation of the fuel injection apparatus 117 on the basis of the detection information of the detecting means 14 and 16 and the specific output characteristic data M1 of the engine 70, the compensating means 21 and 29 for compensating the output characteristic data M1 is provided, and the ECU 11 is structured such as to compute the limit torque value on the basis of the result of compensation of the output characteristic data M1 by the compensating means 21 and 29 and the detection information of the detecting means 14 and 16, and actuate the fuel injection apparatus 117 in correspondence to the limit torque value, the engine manufacturer can make all the output characteristic data M1 stored in the ECU 11 identical (in common) as long as the type of the engine 70 is the same. Further, the engine purchasing manufacturer that mounts the engine 70 to the working vehicle can obtain the result of compensation which complies with its own specification from the compensating means 21 and 29. In other words, it is possible to select an optimum fuel injection control per kind of vehicle to which the engine 70 is mounted, and per working machine which is installed to the working vehicle, by the compensating means 21. Therefore, there can be achieved such an effect that can accomplish both an advantage of the engine manufacturer, that is, an improvement of a general purpose property of the ECU 11, and an advantage of the engine purchasing manufacturer, that is, a reservation of compatibility of the ECU 11 with respect to the working vehicle.

(9) Fuel Injection Control of Common Rail in Accordance with Seventh Embodiment

Next, a description will be given of a fuel injection control of a common rail 120 of a seventh embodiment, with reference to FIG. 22 to FIG. 26. In the seventh embodiment, an output characteristic map M (refer to FIG. 24) serving as an output characteristic data which indicates a relationship between the rotating speed N and the torque T (which may be called as the fuel injection amount or the load) of the diesel engine 70 is previously stored in the memory means (the flush memory or the EEPROM) which is provided in the ECU 11. In the output characteristic map M, a solid line Tmx which is drawn as an upward convex curved shape is a maximum characteristic line which expresses a maximum torque with respect to each of the rotating speeds N (which may be called as a maximum torque line). In this case, as long as the type of the diesel engine 70 is the same, the output characteristic maps M stored in the ECU 11 all come to an identical (common) one. The ECU 11 is basically structured such as to determine the torque T on the basis of the rotating speed N which is detected by the engine speed sensor 14 and an injection pressure and an injection period of each of the injectors 115, compute a target fuel injection amount Ro by using the torque T and the output characteristic map M, and execute such a fuel injection control as to actuate the common rail apparatus 117 on the basis of the result of computation.

Figure 22:
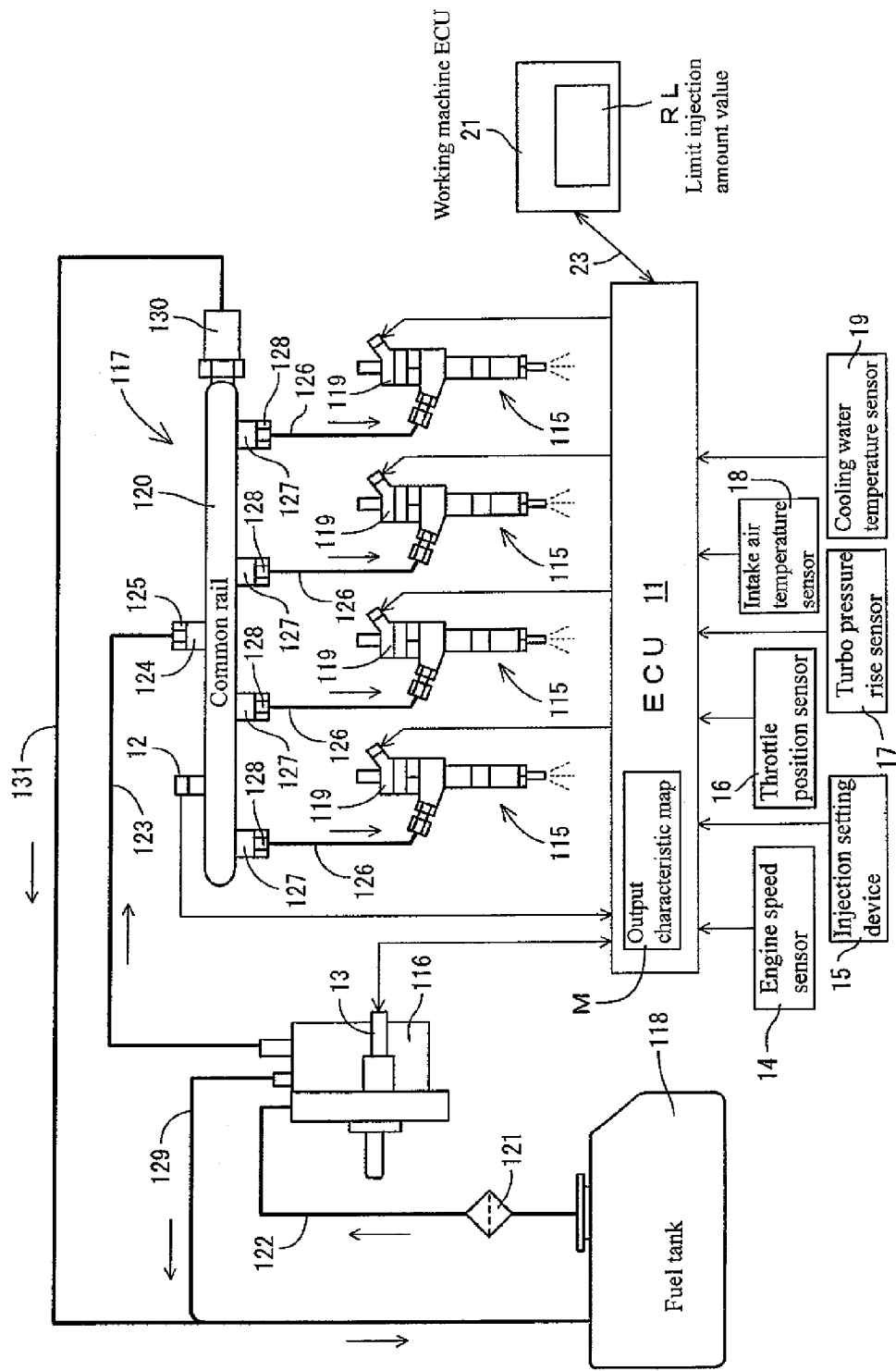
FIG. 22 is an explanatory view of a concept and summarizes a seventh embodiment.
Figure 23:
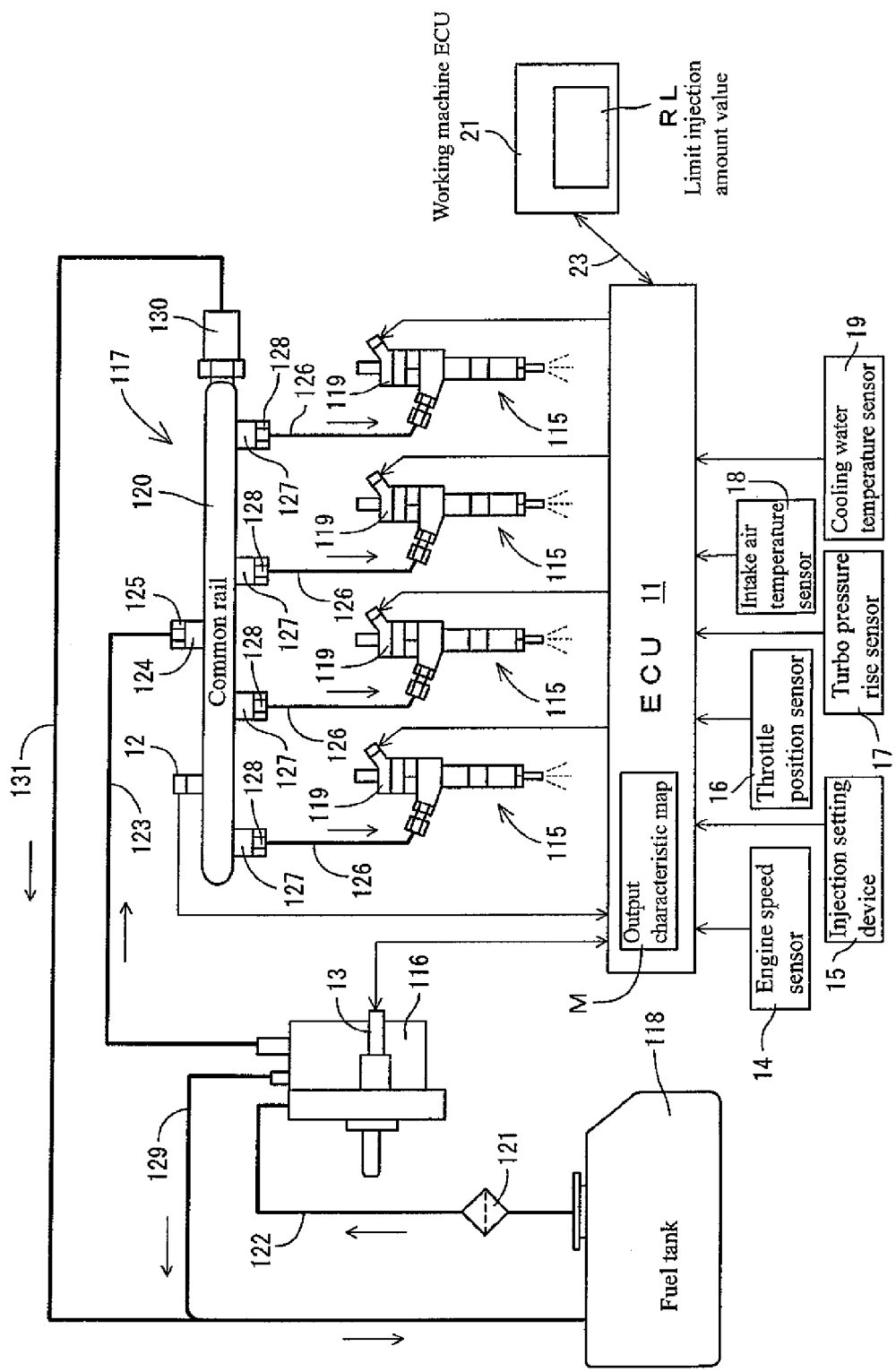
FIG. 23 is an explanatory view of a fuel system of an engine.
Figure 24:
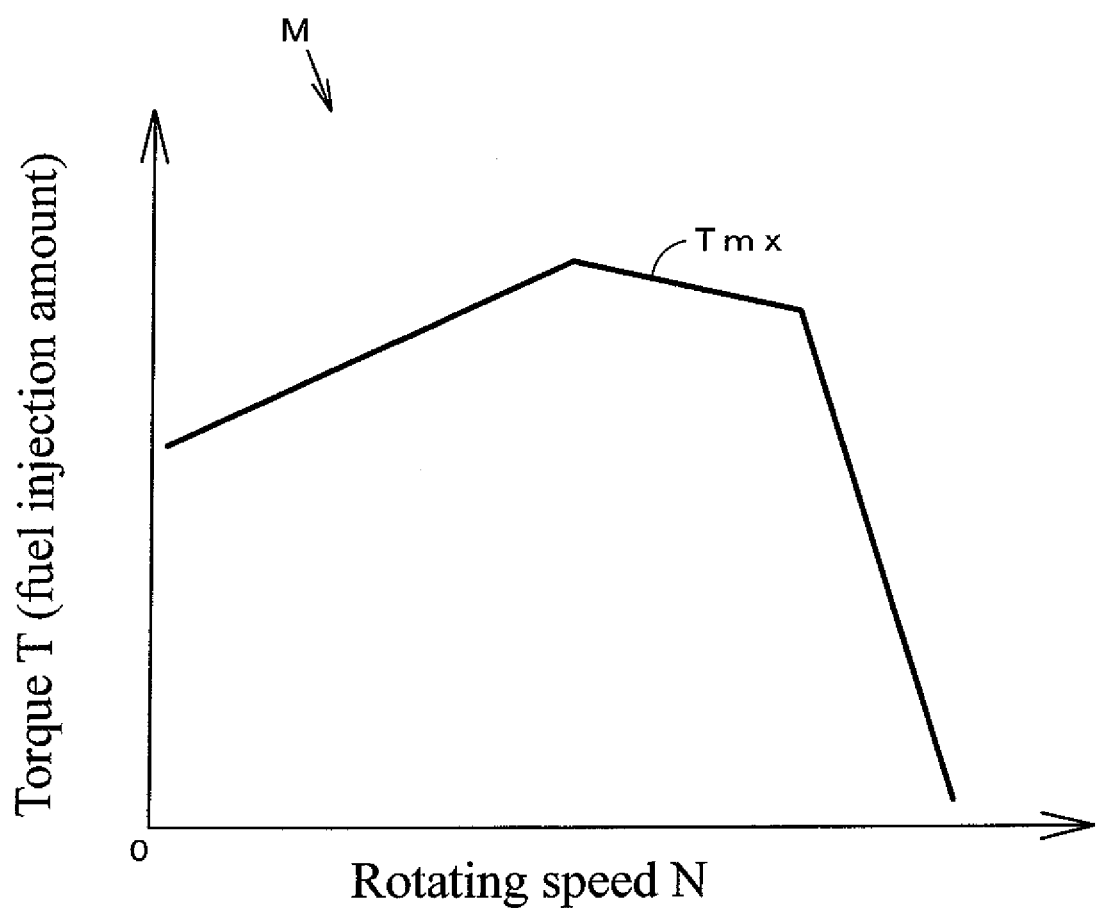
FIG. 24 is an explanatory view of an output characteristic map.
Figure 25:
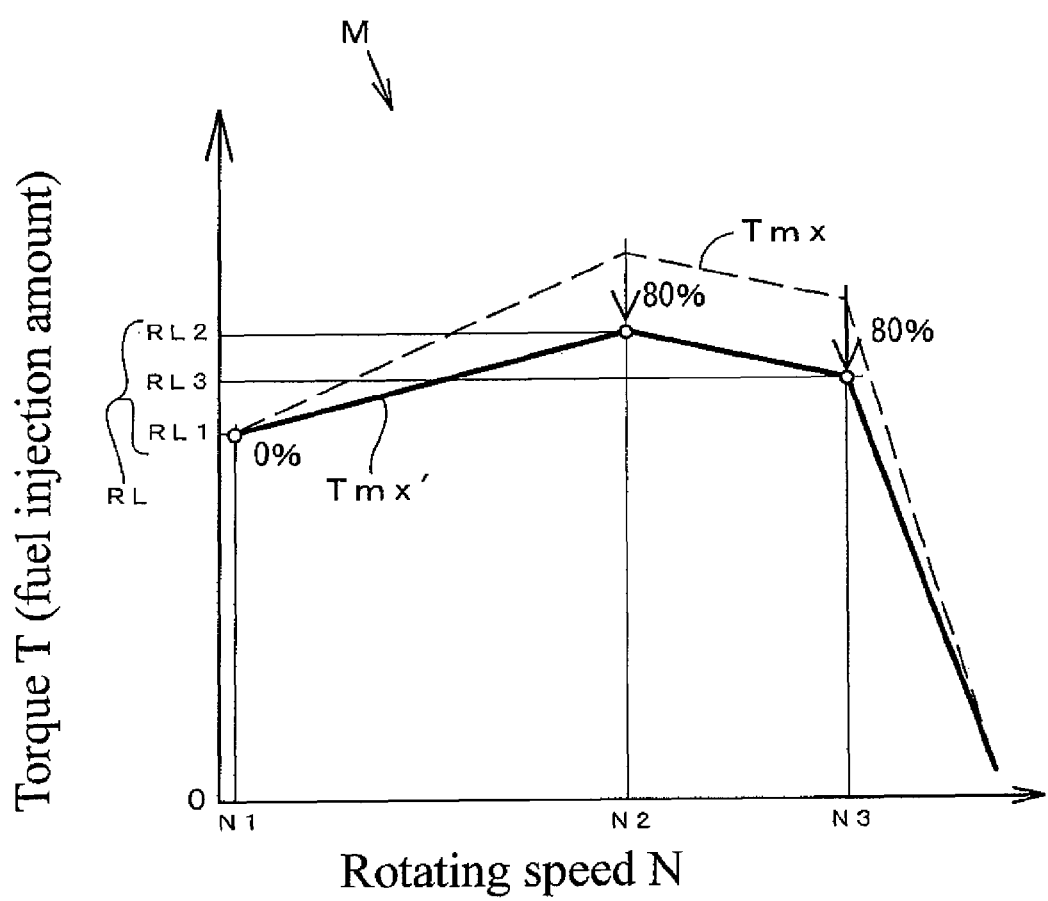
FIG. 25 is an explanatory view of an output characteristic map after correction.

Further, in the seventh embodiment, in the same manner as the first to fifth embodiments, the working machine ECU 21 is electrically connected as the data storage means to the ECU 11 via the CAN communication bus 22. A plurality of limit injection amount values RL which reduce the fuel injection amount with respect to the predetermined rotating speed N in comparison with the maximum characteristic line Tmx of the output characteristic map M are stored as the correction characteristic data for correcting the actuation of the common rail apparatus 117, in the memory means (the flush memory and the EEPROM) of the working machine ECU 21. As shown in FIG. 22, FIG. 23, and FIG. 25, the limit injection amount value RL is stored in the memory means of the working machine ECU 21, for example, while setting three values including a first injection amount value RL1 with respect to a low rotating speed N1 such as a low idle rotating speed, a second injection amount value RL2 correspondence to a rotating speed N2 at a time when a maximum torque is generated, and an injection amount value RL3 with respect to a rated rotating speed N3 to one set. The first injection amount value RL1 of the seventh embodiment is set to a value which is the same level as the injection amount value with respect to the low rotating speed N1 in the original output characteristic map M. The second injection amount value RL2 is set to a value which is about 80% of the injection amount value with respect to the rotating speed N2 at a time when the maximum torque is generated in the original output characteristic map M. Further, the third injection amount value RL3 is set to a value which is about 80% of the injection amount value with respect to the rated rotating speed N3, in the original output characteristic map M.

The ECU 11 to which the working machine ECU 21 is connected is structured such as to correct the maximum characteristic line Tmx of the output characteristic map M in such a direction that the fuel injection amount with respect to the optional rotating speed N is reduced, on the basis of the limit injection amount value RL (a maximum characteristic line Tmx' after the correction, refer to FIG. 25). In this case, the maximum characteristic line Tmx' after the correction comes to a line which is formed by connecting the first to third injection amount values RL1 to RL3. Further, the ECU 11 computes the torque T on the basis of the rotating speed N, and the injection pressure and injection period of each of the injectors 115, and the output characteristic map M after the correction (the maximum characteristic line Tmx') so as to determine the target fuel injection amount Ro, and actuates the common rail apparatus 117 in such a manner as to limit the fuel injection amount with respect to the predetermined rotating speed N on the basis of the result of computation.

The maximum characteristic line Tmx' after the correction (shown by a solid line in FIG. 25) exhibits such a droop characteristic as to limit the fuel injection amount with respect to the predetermined rotating speed N, in comparison with the maximum characteristic line Tmx before the correction (shown by a broken line in FIG. 25). In other words, the maximum torque in the same rotating speed N is smaller in the case that it is determined on the basis of the output characteristic map M after the correction in comparison with the case that it is determined on the basis of the output characteristic map M before the correction (the maximum characteristic line Tmx' after the correction is positioned in an inner side (a lower side) of the maximum characteristic line Tmx before the correction.

Various settings can be employed as the setting of the limit injection amount value RL. For example, the limit injection amount value RL is set such as to come to the maximum characteristic line Tmx' which can obtain the high torque over a wide range rotating speed, for suppressing an engine stop with respect to a work having a great load fluctuation, the limit injection amount value RL is set such as to come to the maximum characteristic line Tmx' which makes the rotating fluctuation due to a load fluctuation small, for enhancing a working efficiency with respect to a work having a small load fluctuation, and the limit injection amount value RL is set such as to come to the maximum characteristic line Tmx' which lowers the rotating speed before the connection, for reducing a shock by connection with respect to a connecting work of a clutch.

In the seventh embodiment, the ECU 11 corrects the output characteristic map M and actuates the common rail apparatus 117 by using the corrected output characteristic map M, as long as the limit injection amount value RL is received from the working machine ECU 21. On the other hand, in the case that is it not received, it actuates the common rail apparatus 117 by using the original output characteristic map M. As the state in which the limit injection amount value RL is not received, for example, there can be listed up a case that the working machine is not installed to the working vehicle, a case that the working machine ECU 21 is not connected to the ECU 11, a case that the limit injection amount value RL is not stored in the working machine ECU 21, a case that the communication can not executed and the like.

As shown in FIG. 22 and FIG. 23, the engine control apparatus of the seventh embodiment is shipped from the engine manufacturer in a state in which the output characteristic map M is written in the ECU 11. The engine purchasing manufacturer connects the working machine ECU 21 which stores the limit injection amount value RL to the ECU 11 via the CAN bus 23, at a time of mounting the diesel engine 70 to the working vehicle.

The plural sets of limit injection amount values RL serving as the correction characteristic data can be stored in correspondence to the kind of the vehicle to which the diesel engine 70 is mounted, and the working machine (the power tiller, the plow, the bucket or the like) which is installed to the working vehicle. In this case, the selection of the limit injection amount value RL in each of the sets may be carried out, for example, by the jumper pin which is provided in the ECU 11, or the select switch which is provided within the cabin of the working vehicle. Further, it is possible to employ such a structure that the limit injection amount value RL in each of the sets is selected on the basis of the control signal from the working machine ECU 21.

Although not being described in detail, the embodiment is structured such as to select the limit injection amount value RL corresponding to the working machine, by installing the working machine to the working vehicle. For example, a discriminating button per working machine may be arranged in a vehicle side hitch which is provided in a rear portion of the working vehicle, and the discriminating button corresponding to the working machine may be structured such as to be set by connection at a time when the working machine side hitch is connected to the vehicle side hitch. In this case, on the assumption that one set of limit injection amount values RL are provided for the power tiller, and another set of limit injection amount values RL are provided for the plow, the discriminating button for the power tiller is set in the case that the power tiller is installed to the working vehicle, and the ECU 11 refers to the one set of limit injection amount values RL for the rotary power tiller, in order to correct the output characteristic map M. In the case that the plow is installed, the discriminating button for the plow is set, and the ECU 11 refers to the another limit injection amount values RL for the plow.

Figure 26:
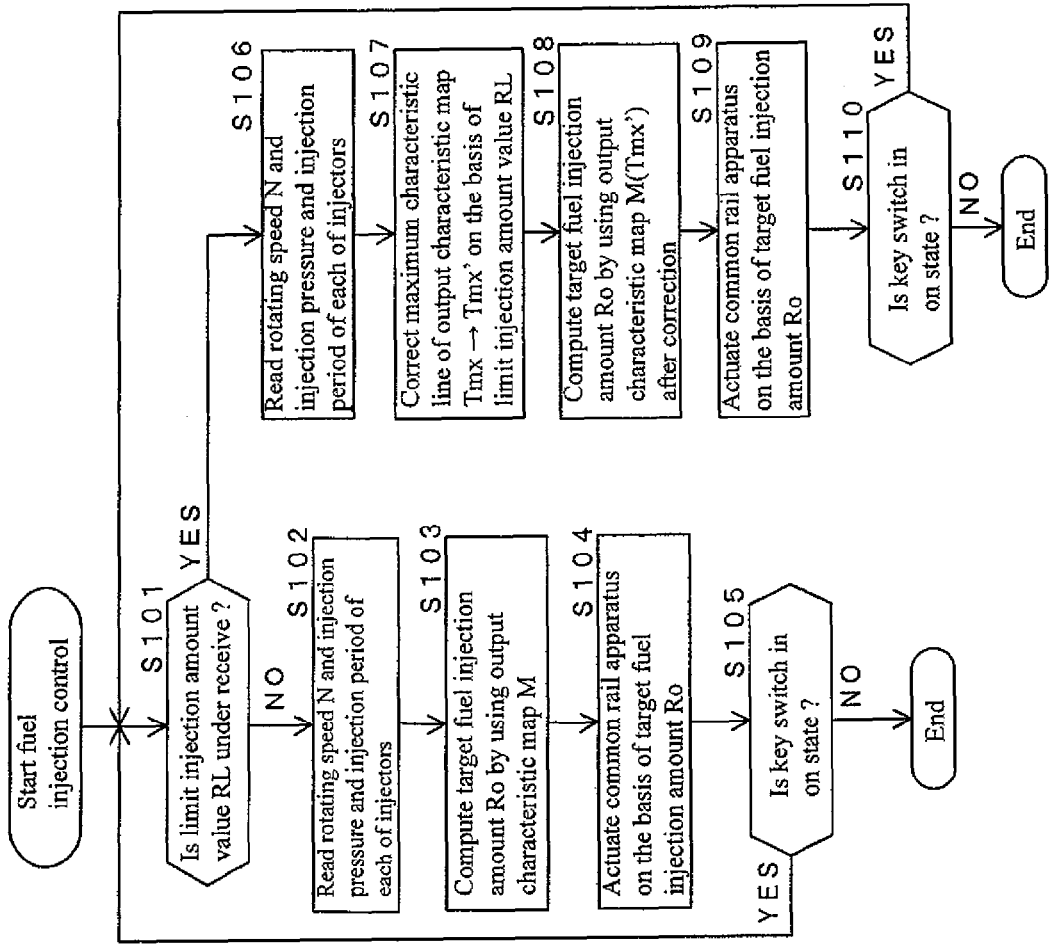
FIG. 26 is a flow chart of a fuel injection control.

A description will be given below of an example of the fuel injection control in the embodiment with reference to a flow chart in FIG. 26. As shown in the flow chart in FIG. 26, the ECU 11 discriminates whether it is under receiving of the limit injection amount value RL from the working machine ECU 21 (a step S101). If it does not receive the limit injection amount value RL (S101: NO), it reads the rotating speed N and the injection pressure and the injection period of each of the injectors 115 at a predetermined timing (per an appropriate time) (S102), and the ECU 11 next refers to the output characteristic map M included in itself, and determines the torque T on the basis of the rotating speed N and the injection pressure and the injection period of each of the injectors 115 which are read previously so as to compute the target fuel injection amount Ro (S103). Further, it actuates the common rail apparatus 117 on the basis of the target fuel injection amount R (S104). Thereafter, if a key switch for applying a power supply (an illustration of which is omitted) is in an on state (S105: YES), it goes back to the step S101 so as to carry on the fuel injection control.

In the step S101, if it receives the limit injection amount value RL (S101: YES), it reads the rotating speed N and the injection pressure and the injection period of each of the injectors 115 at a predetermined timing (per an appropriate time) (S106), and the ECU 11 next corrects the maximum characteristic line Tmx of the output characteristic map M in such a direction that the fuel injection amount with respect to an optional rotating speed N is reduced on the basis of the limit injection amount value RL, and sets the maximum characteristic line to Tmx' (S107). Further, it determines the torque T on the basis of the rotating speed N and the injection pressure and the injection period of each of the injectors 115 which are read previously, refers to the output characteristic map M after the correction (the maximum characteristic line Tmx'), and computes the torque limited target fuel injection amount Ro (S108). Then, it actuates the common rail apparatus 117 on the basis of the torque limited target fuel injection amount Ro (S109). Thereafter, if the key switch (an illustration of which is omitted) for applying the power supply is in an on state (S110: YES), it goes back to the step S101 so as to carry on the fuel injection control.

As is apparent from the description mentioned above and FIG. 22 to FIG. 26, in the engine control apparatus provided with the engine 70 which is mounted to the working vehicle, the fuel injection apparatus 117 which injects the fuel to the engine 70, the detecting means 12 to 19 which detect the drive state of the engine 70, and the ECU 11 which controls the actuation of the fuel injection apparatus 117 on the basis of the detection information of the detecting means 12 to 19 and the specific output characteristic data of the engine 70, since the engine control apparatus has the data storage means 21 in which the correction characteristic data RL for correcting the output characteristic data M is stored, and the ECU 11 corrects the output characteristic data M on the basis of the correction characteristic data RL while receiving the correction characteristic data RL from the data storage means 21, and actuates the fuel injection apparatus 117 on the basis of the corrected output characteristic data M and the detection information of the detecting means 12 to 19, the engine manufacturer can make the output characteristic data M stored in the ECU 11 in common, as long as the type of the engine 70 is the same. The engine purchasing manufacturer can execute a fuel injection control which is optimum for its own specification by using the correction characteristic data RL, without replacing the output characteristic data M by the characteristic data of its own specification. There can be achieved such an effect that can accomplish both the advantage of the engine manufacturer, that is, the improvement of a general purpose property of the ECU 11, and the advantage of the engine purchasing manufacturer, that is, the reservation of compatibility of the ECU 11 with respect to the working vehicle.

As is apparent from the description mentioned above and FIG. 22 to FIG. 26, since the ECU 11 actuates the fuel injection apparatus 117 on the basis of the output characteristic data M and the detection information of the detecting means 12 to 19, in the case that it does not receive the correction characteristic data RL from the data storage means 21, there can be achieved such an effect that it is possible to easily execute an efficient fuel injection control, for example, in correspondence to with or without the installation of the working machine, the used condition of the working vehicle or the like, without a detailed setting operation or the like.

As is apparent from the description mentioned above and FIG. 22 to FIG. 26, since the data storage means 21 stores a plurality of limit injection amount values RL in which the fuel injection amount with respect to the predetermined rotating speed N is reduced in comparison with the maximum characteristic line Tmx of the output characteristic data M, as the correction characteristic data, and the ECU 11 corrects the maximum characteristic line Tmx of the output characteristic data M in such a direction that the fuel injection amount with respect to the optional rotating speed N is reduced, on the basis of the plurality of limit injection amount values RL, it is possible to maintain a droop characteristic (Tmx') of the output characteristic data M after the correction in a state which is close to a droop characteristic (Tmx) of the output characteristic data M before the correction. Therefore, there can be achieved such an effect that it is possible to execute the fuel injection control, in a state which is close to the design concept of the engine manufacturer and complies with the specification of the engine purchasing manufacturer. Further, there is also such an advantage that it is possible to easily set a variation of the droop characteristic on the basis of the limit injection amount value RL, and it becomes easy to cope with the various settings of the fuel injection control.

As is apparent from the description mentioned above and FIG. 22 to FIG. 26, since the plurality of limit injection amount values RL are constructed by setting three points including the injection amount value RL1 with respect to the low speed rotating speed N1, the injection amount value RL2 with respect to the rotating speed N2 at a time when the maximum torque is generated, and the injection amount value RL3 with respect to the rated rotating speed N3 to one set, it is possible to efficiently revise the maximum characteristic line downward (Tmx→Tmx') by a reduced number of points.

(10) Whole Structure of Diesel Engine

Figure 27:
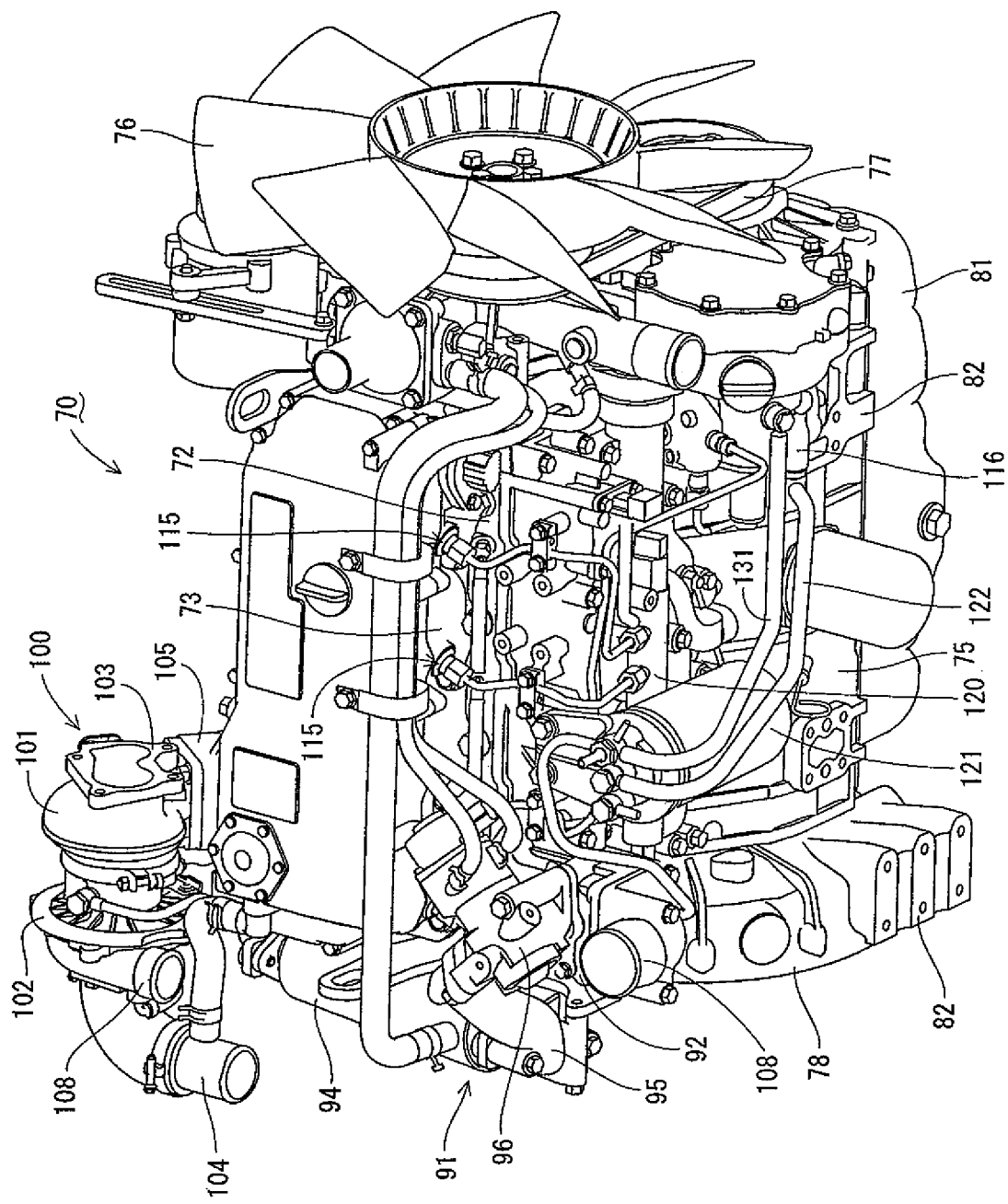
FIG. 27 is an outer appearance perspective view of a diesel engine.

Next, a description will be given of a whole structure of the diesel engine 70 with reference to FIG. 27. The diesel engine 70 is of a 4-cylinder type, and an exhaust manifold (an illustration of which is omitted) is arranged in a left side surface of a cylinder head 72 in the diesel engine 70. An intake manifold 73 is arranged in a right side surface of the cylinder head 72. The cylinder head 72 is mounted on a cylinder block 75 in which a crank shaft and a piston (an illustration of which is omitted) are embedded. Front and rear leading end portions of the crank shaft are protruded respectively from both front and rear surfaces of the cylinder block 75. A cooling fan 76 is provided in a front surface side of the cylinder block 75. It is structured such that a rotating force is transmitted to the cooling fan 76 from a front end side of the crank shaft 74 via a V belt 77.

A flywheel housing 78 is firmly attached to a rear surface of the cylinder block 75. A flywheel (an illustration of which is omitted) is arranged within the flywheel housing 78. The flywheel is pivoted to a rear end side of the crank shaft, and is structured such as to rotate integrally with the crank shaft. It is structured such as to pick up a power of the diesel engine 70 to a drive portion of the working vehicle via the flywheel. An oil pan mechanism 81 is arranged in a lower surface of the cylinder block 75. An engine leg attaching portion 82 is provided in each of right and left side surfaces of the cylinder block 75 and right and left side surfaces of the flywheel housing 78. An engine leg body (an illustration of which is omitted) having a vibration proof rubber is fastened by bolt to each of the engine leg attaching portions 82. The diesel engine 70 is supported in a vibration proofing manner to an engine support chassis 84 of a tractor 201 via each of the engine leg bodies.

An air cleaner (an illustration of which is omitted) is connected to an inlet side of the intake manifold 73 via a collector 92 which constructs an EGR apparatus 91 (an exhaust gas recirculation apparatus). An ambient air which is removed dust and purified by the air cleaner 88 is transferred to the intake manifold 73 via the collector 92 of the EGR apparatus 91, and is fed to each of the cylinders of the diesel engine 70. The EGR apparatus 91 is provided with the collector (an EGR main body case) 92 which mixes a recirculation exhaust gas of the diesel engine 70 (an EGR gas from the exhaust manifold 71) with a fresh air (an outside air from the air cleaner) so as to feed to the intake manifold 73, a recirculation exhaust gas pipe 95 which is connected to the exhaust manifold 71 via an EGR cooler 94, and an EGR valve 96 which communicates the collector 92 with the recirculation exhaust gas pipe 95.

In accordance with the structure mentioned above, the outside air is fed into the collector 92 from the air cleaner, and the EGR gas (a part of the exhaust gas which is discharged from the exhaust manifold 71) is fed into the collector 92 from the exhaust manifold 71 via the EGR valve 96. After the outside air from the air cleaner and the EGR gas from the exhaust manifold 71 are mixed within the collector 92, the mixed gas within the collector 92 is fed to the intake manifold 73. In other words, a part of the exhaust gas which is discharged from the diesel engine 70 to the exhaust manifold 71 is recirculate into the diesel engine 70 from the intake manifold 73, whereby a maximum combustion temperature at a time of a high load operation is lowered, and a discharge amount of NOx (nitrogen oxide) from the diesel engine 70 is reduced.

A turbo supercharger 100 is attached to a left side surface of the cylinder head 72. The turbo supercharger 100 is provided with a turbine case 101 which has a turbine wheel (an illustration of which is omitted) built-in, and a compressor case 102 which has a blower wheel (an illustration of which is omitted) built-in. The exhaust manifold is connected to an exhaust gas intake pipe 105 of the turbine case 101. Although an illustration is omitted, a tail pipe is connected to an exhaust gas discharge pipe 103 of the turbine case 101 via a muffler, a diesel particulate filter or the like. In other words, the exhaust gas discharged from each of the cylinders of the diesel engine 70 to the exhaust manifold 71 is discharged to an outside portion from the tail pipe via the turbo supercharger 100 or the like.

On the other hand, an air supply discharge side of the air cleaner is connected to an air supply intake side of the compressor case 102 via an air supply pipe 104. The intake manifold 73 is connected to an air supply discharge side of the compressor case 102 via a supercharger pipe 108. In other words, the outside air which is removed dust by the air cleaner is fed to each of the cylinders of the diesel engine 70 from the compressor case 102 via the supercharger pipe 108.

A fuel tank 118 (refer to FIG. 3 and the like) is connected to each of the injectors 115 for four cylinders which are provided in the diesel engine 70, via the common rail apparatus 117 and a fuel feed pump 116. Each of the injectors 115 is provided with an electromagnetically opening and closing control type fuel injection valve 119. The common rail apparatus 117 is provided with a cylindrical common rail 120. The fuel tank 118 is connected to an intake side of the fuel feed pump 116 via a fuel filter 121 and a low pressure pipe 122. The common rail 120 is connected to a discharge side of the fuel feed pump 116 via a high pressure pipe 123.

(11) Outline of Tractor

Figure 28:
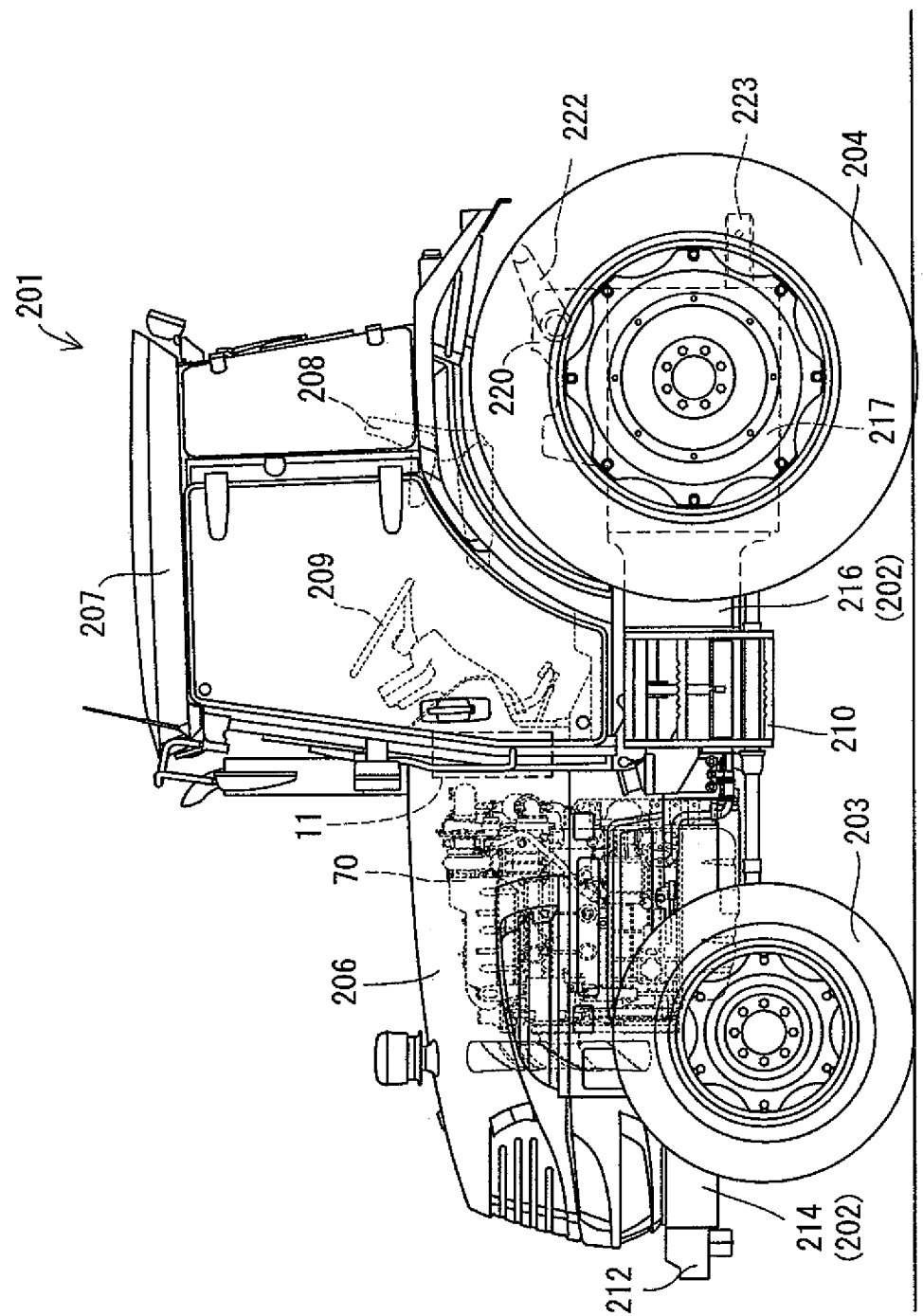
FIG. 28 is a side elevational view of a tractor.

Next, a description will be given of an outline of the tractor 201 serving as the working vehicle to which the diesel engine 70 is mounted, with reference to FIG. 28. The tractor 201 is structured such as to travel forward and backward by supporting a travel machine body 202 by a pair of right and left front wheels 203 and a pair of right and left rear wheels 204, and driving the rear wheels 204 and the front wheels 203 by the diesel engine 70 which is mounted to a front portion of the travel machine body 202.

The diesel engine 70 mounted to the front portion of the travel machine body 202 is covered with a hood 206. A cabin 207 is installed to an upper surface of the travel machine body 202, and with a control seat 208 on which an operator seats, and a round wheel type control wheel 209 serving as steering means which is positioned in a front side of the control seat 208 are provided in the cabin 207. It is structured such that the operator seating on the control seat 208 rotationally operates the control wheel 209, whereby an angle of steering (a steering angle) of the right and left front wheels 203 is changed in correspondence to an amount of operation. A bottom portion of the cabin 207 is provided with a step 210 for the operator to get on board. The ECU 11 is arranged within a front column of the cabin 207.

The travel machine body 202 is constructed by an engine frame 214 which has a front bumper 212 and a front axle case 213, and right and left machine body frames 216 which are detachably connected to a rear portion of the engine frame 214 by a bolt fastening. The front wheel 203 is attached via the front axle case 213 which is installed in such a manner as to protrude outward from an outer side surface of the engine frame 214. Further, a transmission case 217 for approximately shifting an output from the diesel engine 70 so as to transmit to the rear wheel 204 (the front wheel 203) is connected to a rear portion of the machine body frame 216. The rear wheel 204 is attached to the transmission case 217 via a rear axle case (an illustration of which is omitted) which is installed in such a manner as to protrude outward from an outer side surface of the transmission case 217.

A hydraulic working machine elevating mechanism 220 for moving up and down the working machine (an illustration of which is omitted) such as the power tiller, the plow or the like is detachably attached to an upper surface of a rear portion of the transmission case 217. The working machine is connected to the rear portion of the transmission case 217 via a lower link (an illustration of which is omitted) and a top link 222 in such a manner as to be movable up and down. Further, a rear side surface of the transmission case 217 is provided with a PTO shaft 223 which drives the working machine.

Although an illustration is omitted, it is structured such as to transmit the rotating power of the diesel engine 70 to the front surface side of the transmission case 217 from the rear surface side of the diesel engine 70 via the crank shaft, the flywheel and the like. It is structured such that the rotating power of the diesel engine 70 is transmitted to the transmission case 217, the rotating power of the diesel engine 70 is next shifted appropriately by a hydraulic continuously variable transmission or a travel auxiliary shift gear mechanism of the transmission case 217, and a driving force is transmitted to the rear wheel 204 from the transmission case 217 via a differential gear mechanism or the like. Further, it is structured such as to transmit the rotation of the diesel engine 70 which is appropriately shifted by the travel auxiliary shift gear mechanism to the front wheel 203 from the transmission case 217 via the differential gear mechanism or the like of the front axle case 213.

(12) Others

The present invention is not limited to the embodiments mentioned above, but can be embodied into various modes. For example, the present invention is not limited to the engine control apparatus of the engine which is mounted to the tractor, but can be applied as an engine control apparatus of an engine which is mounted to an agricultural machine such as a combined harvester, a rice planting machine or the like, or a specific working vehicle such as a wheel loader or the like. The fuel injection apparatus is not limited to the common rail type, but may be constructed as an electronic governor type. The communication bus is not limited to the CAN communication bus, but may be constructed as the other communication buses such as an LAN communication bus. In addition, the structures of the respective portions are not limited to the illustrated embodiments, but can be variously modified within the scope which does not depart from the sprit of the present invention.

REFERENCE SIGNS LIST

M, M1 Output characteristic map (output characteristic data)
M2, M3 Correction characteristic map (correction characteristic data)
RL Limit injection amount value (correction characteristic data)
N Rotating speed
T Torque
11 ECU
14 Engine speed sensor (detecting means)
16 Throttle position sensor (detecting means)
21 Working machine ECU (data storage means)
21' Data ECU (data storage means)
23 CAN communication bus
25 Identifying means
27 Informing means
28a, 28b Operation button (select switch means)
29 Manual operating means (volume switch)
70 Diesel engine
115 Injector
117 Common rail apparatus
120 Common rail

The invention claimed is:
1. An engine control apparatus for an engine mounted to a working vehicle, the working vehicle being a combination of a vehicle and a working machine, the engine control apparatus comprising:
 a fuel injection apparatus configured to inject a fuel to the engine;
 detecting means which detects a drive state of the engine, including rotating speed and torque;
 an identification circuit having a setting that identifies a vehicle type and a working machine type of the working vehicle;
 a first data storage circuit that stores a first output characteristic data set for the engine based on said rotating speed and said torque;
 a second data storage circuit that stores a second output characteristic data set, which is a correction to the first output characteristic data set, based on said rotating speed and said torque and further based on said identified vehicle type and said identified working machine type of said working vehicle; and
 an ECU which tests said identification circuit, the ECU having a first configuration to actuate the fuel injection apparatus that is based on said detected drive state and data read from the first output characteristic data set when testing of said identification circuit results in a first detected configuration of the working vehicle, and having a second configuration to actuate the fuel injection apparatus that is based on said detected drive state and data read from the first output characteristic data set and the second output characteristic data set in response to said rotating speed and torque when testing of said identification circuit results in a second detected configuration of the working vehicle.

2. The engine control apparatus according to claim 1, wherein the second data storage circuit stores a plurality of output characteristic data sets, each one data set of said stored plurality of output characteristic data sets corresponding to a different permutation of vehicle type and working machine type, one of said stored plurality of output characteristic data sets second output characteristic data set; and wherein the ECU selects one of said stored plurality of output characteristic data sets according to the setting of the identification circuit.

3. The engine control apparatus according to claim 1, wherein said second output characteristic data set stores a torque limit rate which limits the torque with respect to a predetermined rotating speed, and the ECU computes an output on the basis of the torque limit rate.

4. The engine control apparatus according to claim 2, wherein the identification circuit comprises select switch means which is provided in the working vehicle.

5. The engine control apparatus according to claim 1, wherein the second data storage circuit is a variable-resistor type rotating speed limit switch having different settings, selected manually, each one setting corresponding to a member of said second output characteristic data set.

6. The engine control apparatus according to claim 1, wherein the first data storage circuit is part of the ECU.

7. The engine control apparatus according to claim 1, wherein the second data storage circuit comprises external memory means in electrical communication with said ECU.

8. The engine control apparatus according to claim 1, wherein the second data storage circuit stores a plurality of limit injection amount values in which a fuel injection amount with respect to a predetermined rotating speed is reduced in comparison with a maximum characteristic line of the second output characteristic data set, as correction characteristic data, and wherein the ECU corrects the maximum characteristic line in a direction by which the fuel injection amount with respect to an optional rotating speed is reduced, on the basis of the plurality of limit injection amount values.

9. The engine control apparatus according to claim 8, wherein the plurality of limit injection amount values are constructed by setting three points including an injection amount value with respect to a low speed rotating speed, an injection amount value with respect to a rotating speed at a time when a maximum torque is generated, and an injection amount value with respect to a rated rotating speed to one set.

10. The engine control apparatus according to claim 1, wherein said working machine type is one among a group of working machine types comprising: a power tiller, a plow, and a bucket.

* * * * *